United States Patent
Kobayashi et al.

(10) Patent No.: US 6,690,522 B2
(45) Date of Patent: Feb. 10, 2004

(54) OPTICAL PRISM FOR PROJECTING IMAGE

(75) Inventors: Hiroyoshi Kobayashi, Tokyo (JP);
Kazuya Yamanaka, Tokyo (JP);
Yoshihiro Maeda, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/116,098

(22) Filed: Apr. 5, 2002

(65) Prior Publication Data

US 2002/0105738 A1 Aug. 8, 2002

Related U.S. Application Data

(62) Division of application No. 09/049,111, filed on Mar. 27, 1998, now Pat. No. 6,441,978.

(30) Foreign Application Priority Data

Mar. 28, 1997 (JP) .............................. 9-094595

(51) Int. Cl.[7] ................................................ G02B 5/04
(52) U.S. Cl. ...................................... 359/834; 359/631
(58) Field of Search ................................ 359/831, 834, 359/833, 409, 410, 411, 480, 481, 630, 625, 629, 631

(56) References Cited

U.S. PATENT DOCUMENTS

| 3,860,329 | A | | 1/1975 | Baker et al. ................. 359/833 |
|---|---|---|---|---|
| 5,696,521 | A | * | 12/1997 | Robinson et al. ............... 345/8 |
| 5,699,186 | A | | 12/1997 | Richard ....................... 359/834 |
| 5,818,641 | A | | 10/1998 | Takahashi .................... 359/629 |
| 5,838,504 | A | | 11/1998 | Ichikawa et al. ........... 359/431 |
| 5,973,728 | A | | 10/1999 | Levitan ........................ 348/77 |
| 6,049,429 | A | | 4/2000 | Iizuka et al. ................. 359/631 |

* cited by examiner

*Primary Examiner*—Euncha Cherry
(74) *Attorney, Agent, or Firm*—Pillsbury Winthrop LLP

(57) ABSTRACT

An optical prism (1) for reflecting incident light from an incidence surface (2) suited for incidence of light from an LCD (20) or the like for at least twice before emitting the reflected light as emission light from a predetermined emission surface (4). The optical prism has side surfaces (6L and 6R) crossing the incidence and emission surfaces (2 and 4) and including receded surfaces 7L and 7R formed such as not to impede an optical path of an effective size, the incident light being led along the optical path from the incidence surface to the emission surface.

14 Claims, 18 Drawing Sheets

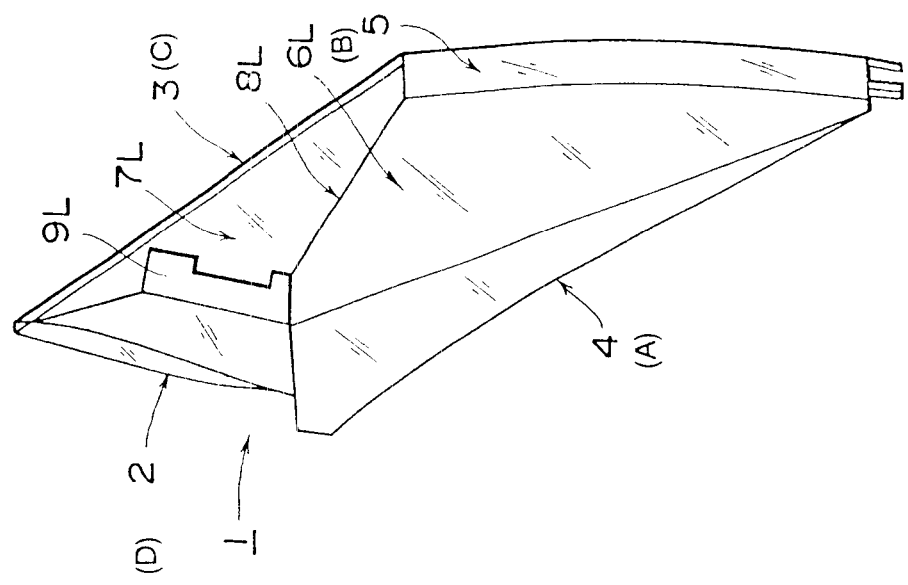
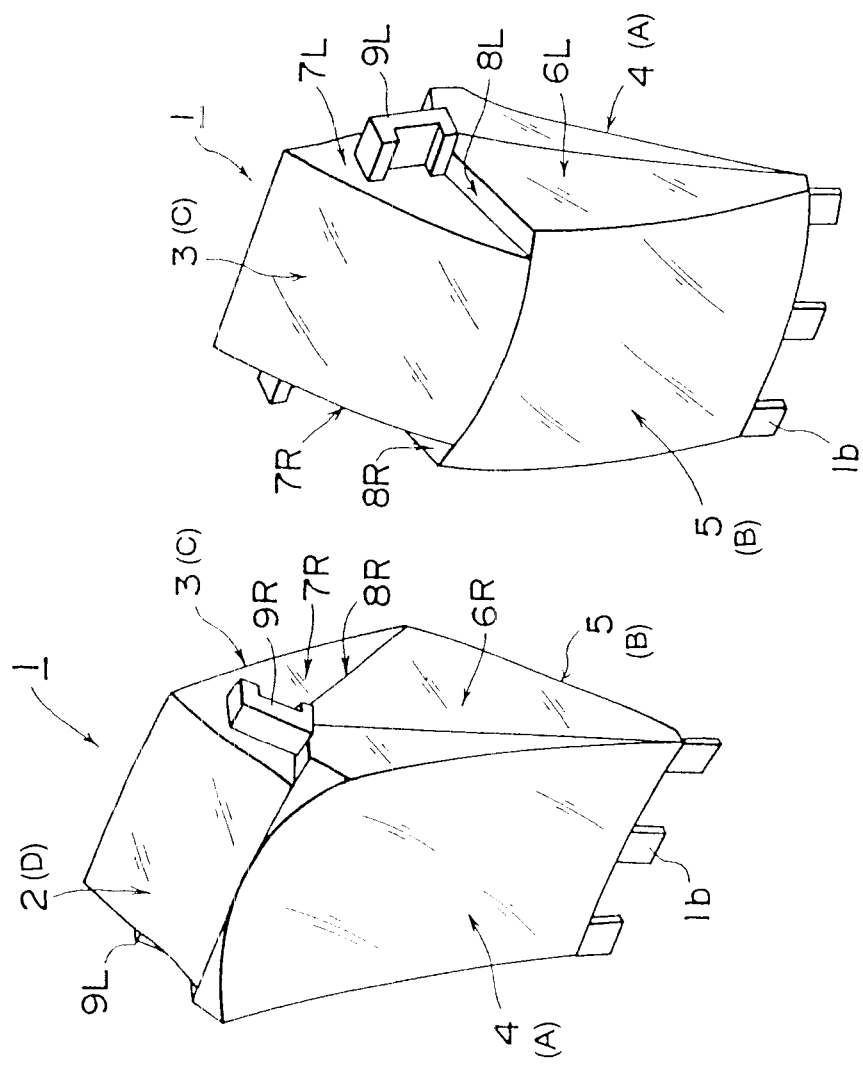

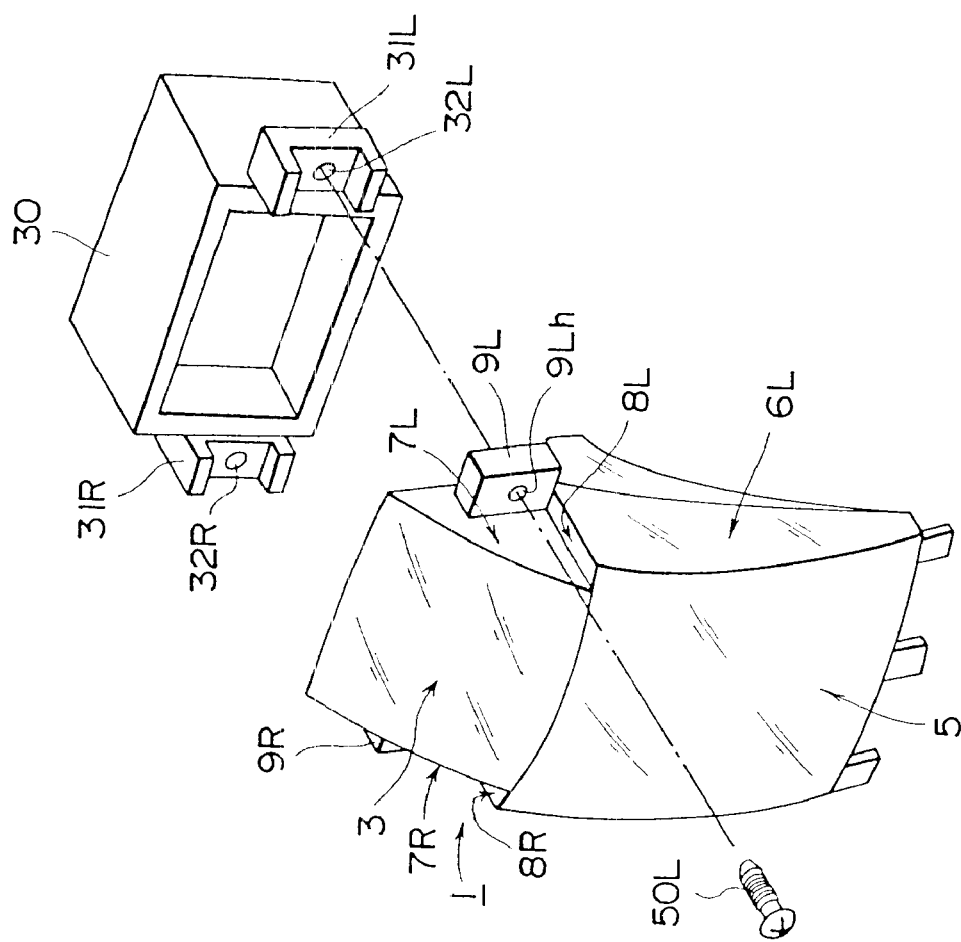
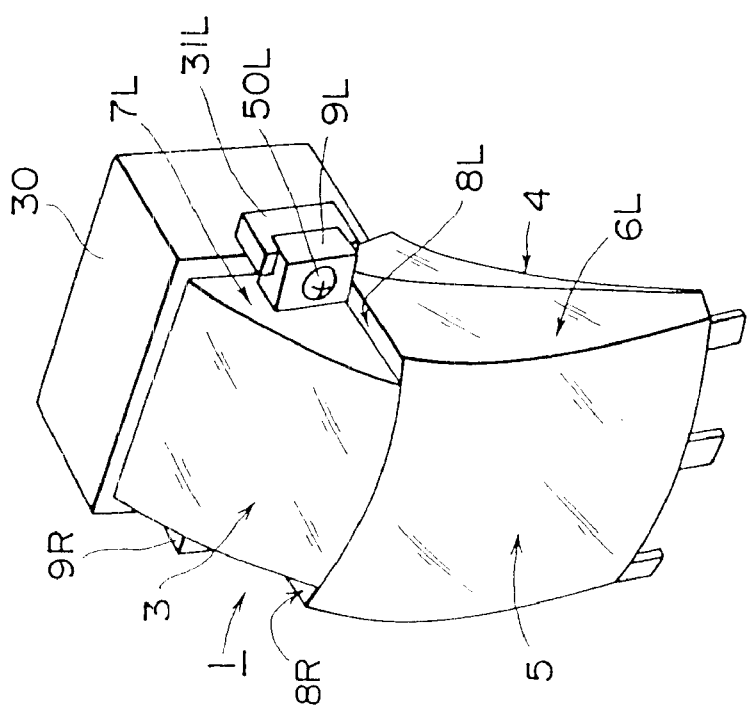
FIG. 6B
FIG. 6A

A SECTIONAL VIEW

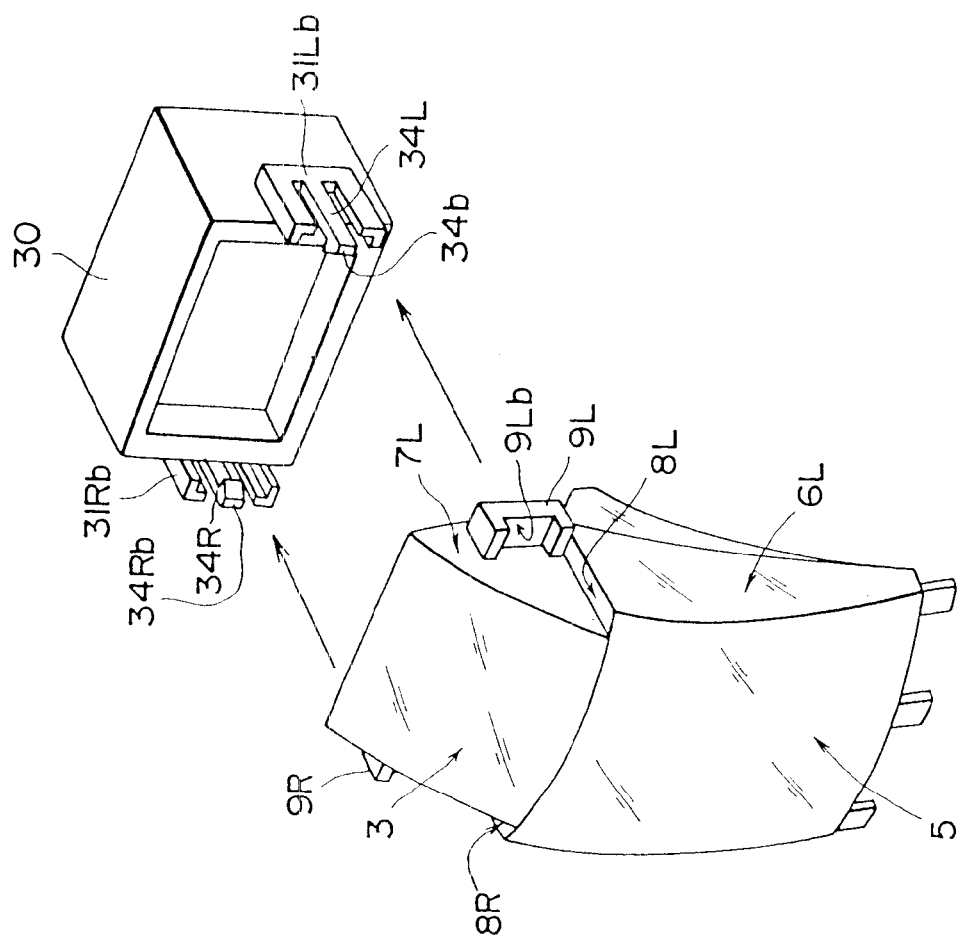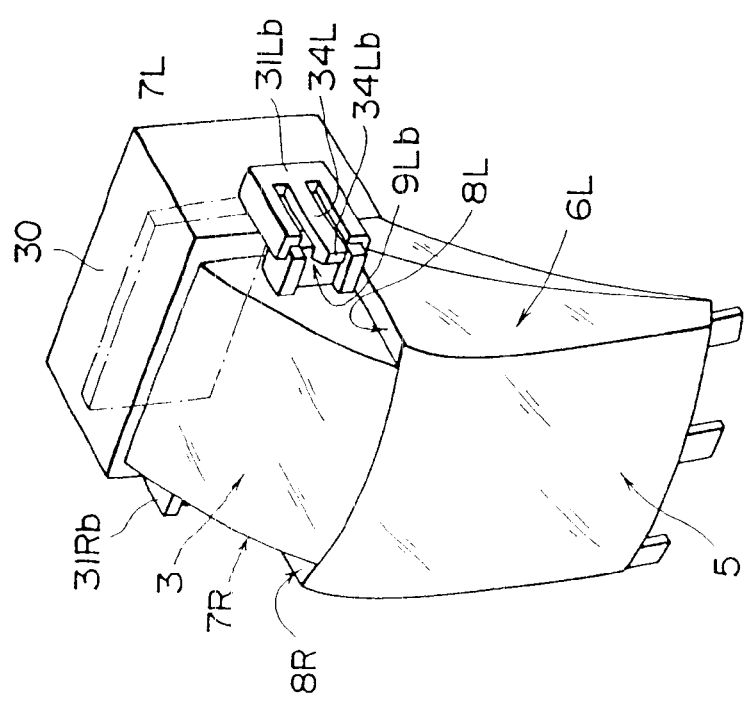
FIG. 8A
FIG. 8B

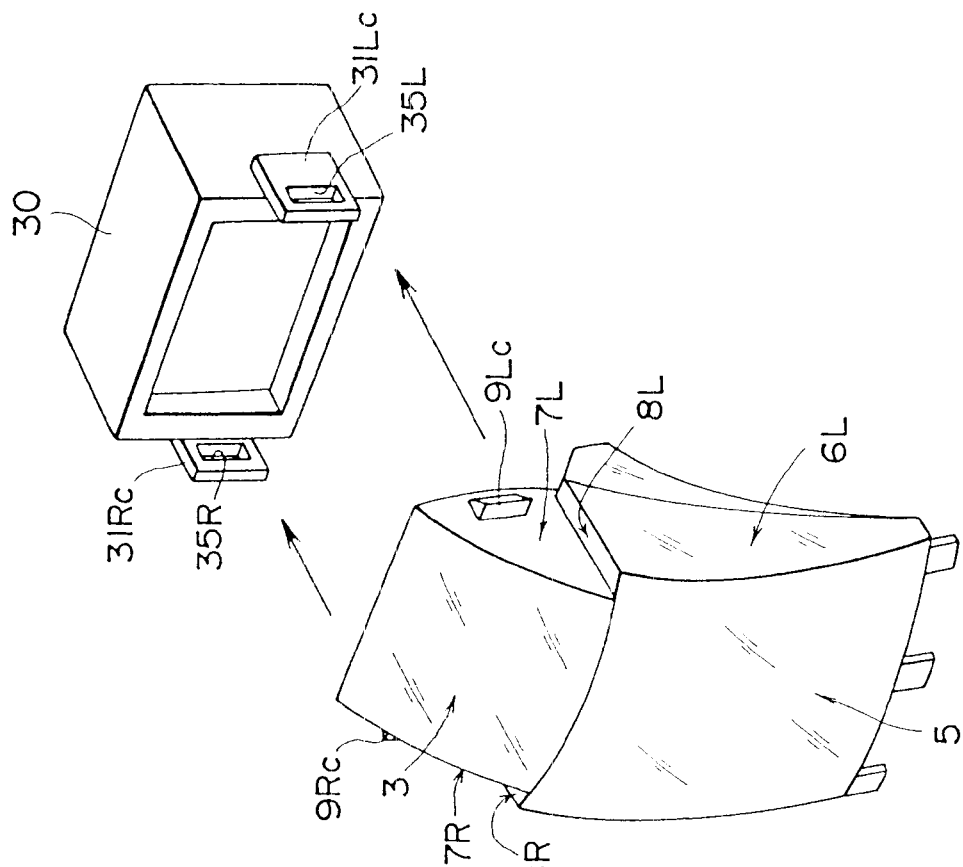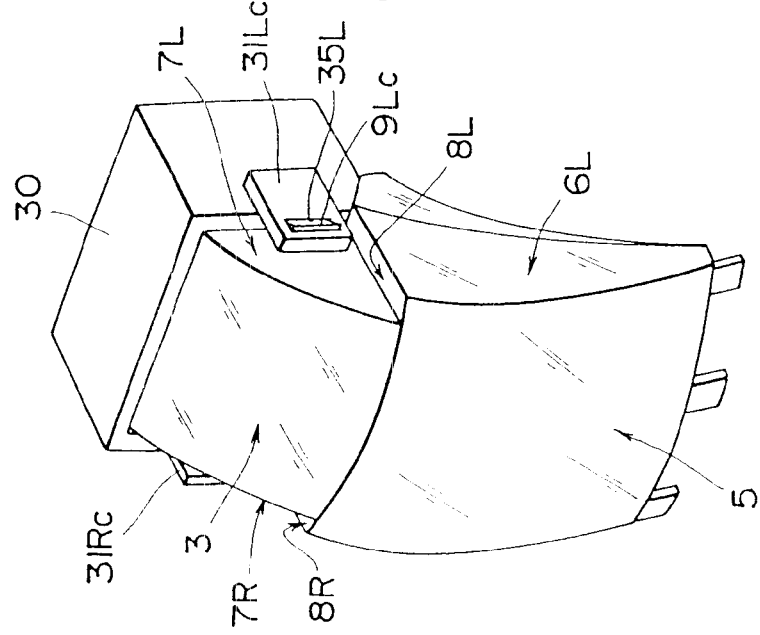

FIG. 13A
FIG. 13B
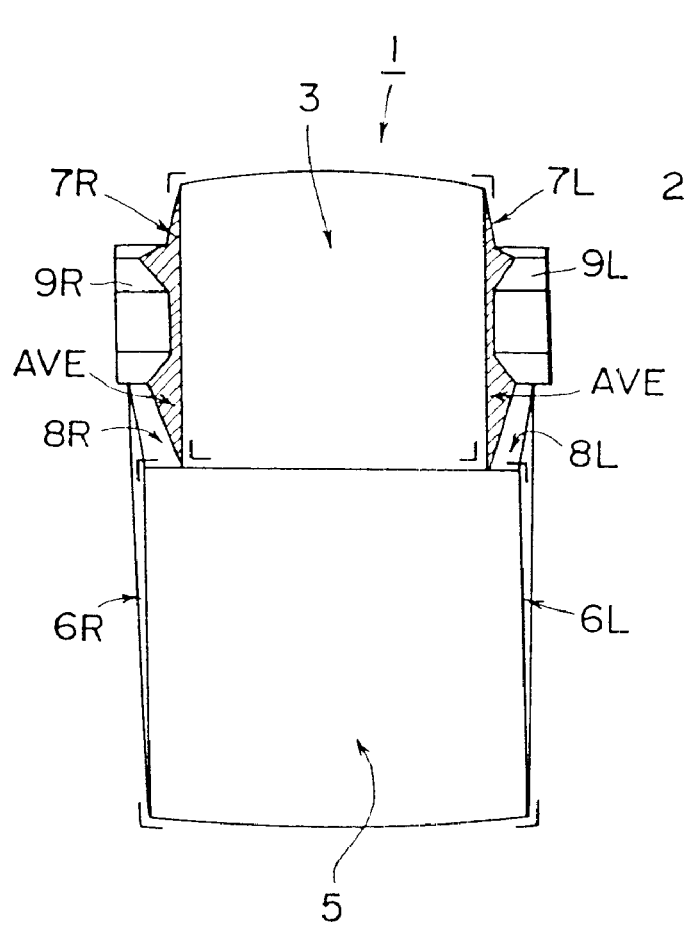
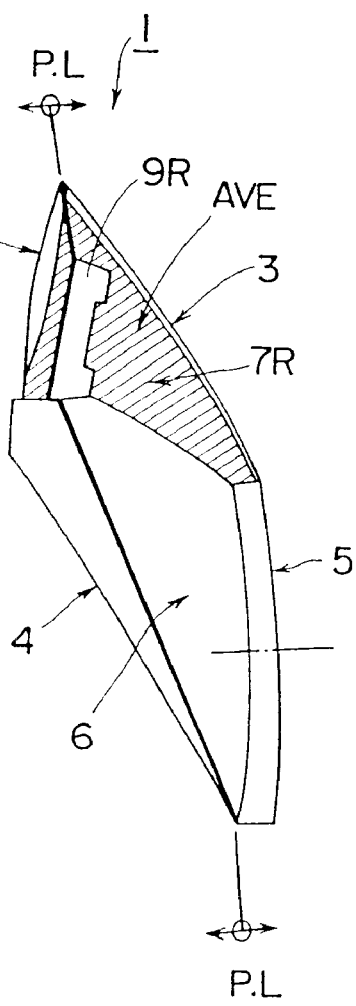

NO DIE REMOVAL SLOPE / DIE REMOVAL SLOPE

NO SIDE DIE REMOVAL SLOPE / SIDE DIE REMOVAL SLOPE

WITH ROUGHENING TREATMENT

FIG. 16A
FIG. 16B
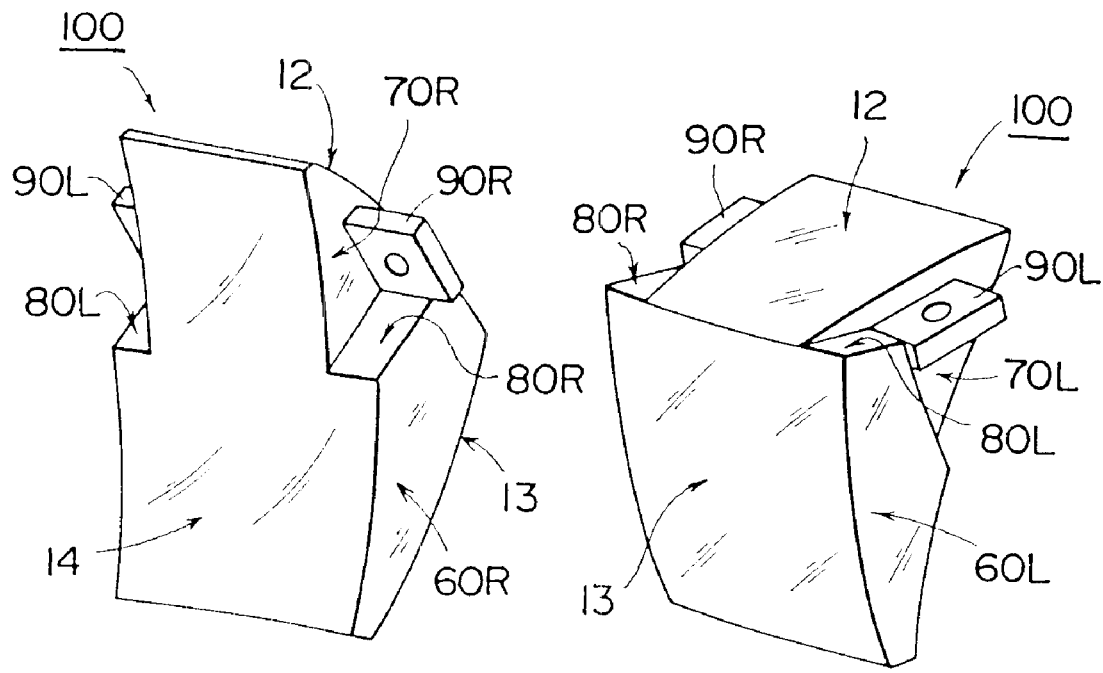
FIG. 16C
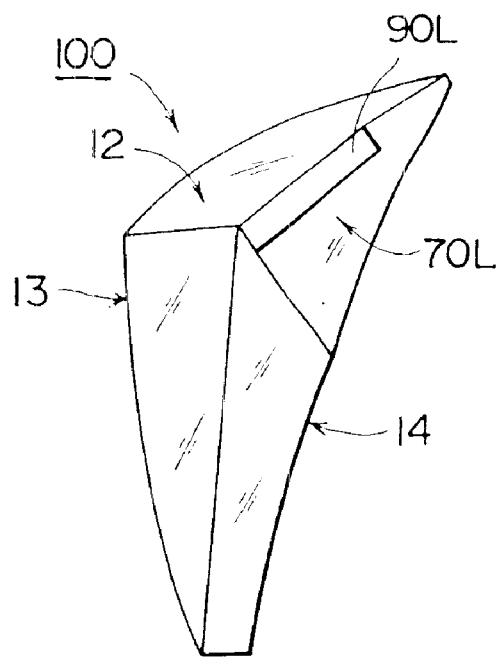

(1)

OPTICAL PRISM FOR PROJECTING IMAGE

This Application claims benefit to and is a Divisional application of application Ser. No. 09/049,111 filed Mar. 27, 1998, now patented U.S. Pat. No. 6,441,978, the entire contents of which is incorporated herein by reference.

BACKGROUND OF THE INVENTION

The present invention relates to an optical prism which is used in an optical system for projecting image, produced on a liquid crystal or like image display, onto a viewer's eye ball retina. Such an optical prism is a main optical element in an image display unit in a head mounted display (abbreviated HMD), in which the image display unit is held at a predetermined position by a frame member mounted on the viewer's head for single- or double-eye image viewing.

Recently, development of such HMDs is in progress, and these devices are finding increasing applications in various fields, such as medical, construction and educational fields and also amusement field such as various game machines.

Meanwhile, there is a trend for developing VGA purpose devices which can display high quality images and also displays of data systems as a version of OA (office automation) systems.

Many HMDs having been developed or proposed up to date, are of double-eye viewing type having a left and right image display for the left and right eyes for viewing these image displays with both eyes. For OA purposes, on the other hand, HDMs of single-eye viewing type also have been proposed. Such an HMD permits a single eye to view an image display, while permitting a keyboard and other operating sections to be operated simultaneously using the other eye, forward and at-hand visual field thereof being ensured to this end.

The OA and like purpose HMDs are desirably compact and handy in construction, so that they can be worn for use in a sense just like wearing glasses.

However, HMDs for general home applications are stage of development, and no proposal has been made for a product, which is not only handy but also can sufficiently solve various specific technical problems posed in its manufacture.

Japanese Laid-Open Patent Publication No. 8-234147, for instance, shows an optical prism, which reflects reflected light from an incidence surface, having been incident from a display face of an LCD or like display, at least twice in itself before emitting the light from a predetermined emission surface to the outside such that the emitted light is led to a viewer's pupil.

This optical prism is a one-piece member having a plurality of non-spherical reflecting surfaces, and satisfies various optical requirements even when constructed as a viewing system.

When constructing an HMD or the like by employing this optical prism, however, it is necessary to hold the optical prism and a liquid crystal display in a regular positional relation with high accuracy in order to obtain an accurate projection liquid crystal display image onto the viewer's retina. It is an unsolved technical problem to ensure the positioning accuracy and also facilitate the manufacture.

SUMMARY OF THE INVENTION

The present invention was made in view of the above circumstances, and its object is to provide an optical system of the type as described, which can ensure necessary accuracy of the positioning of it and an image display to each other and also facilitate manufacture when it is employed as an optical element of OA and various other systems.

Features and advantages over the prior art of the present invention will be described in the following:

(1) According to a first aspect of the present invention, there is provided an optical prism for reflecting incident light from an incidence surface suited for incidence of light from a predetermined display or like light source for at least twice before emitting the reflected light as emission light through a predetermined emission surface. The optical prism has side surfaces crossing the incidence and emission surfaces and including receded surfaces formed such as not to impede an optical path of an effective size, the incident light being led along the optical path from the incidence surface to the emission surface.

Heretofore, no optical prism of this type has been proposed, which has a specific shape such as to permit size reduction of its entirety, including portions for positioning it and a display or the like relative to each other and also maintaining the relative positions of it and the display.

According to the present invention as in (1) above, the receded surfaces do not impede the optical path of the effective size, along which light from the display or like light source is led, and can be utilized for providing portions for positioning the optical prism and the display or the like to each other and maintaining the relative positions of these components. Besides, it is possible to provide portions which do not impede size reduction of the overall structure.

(2) According to a second aspect of the present invention, there is provided the optical prism according to (1), which is fabricated by an injection molding process, and in which the side surfaces have a die removal slope of 1 to 10 degrees with respect to a die removal direction in the injection molding process.

Heretofore, no optical prism of this type has been proposed, which has a specific shape suited for mass production.

According to the present invention as in (2) above, the optical prism has a specific shape which, in addition to the effect obtainable according to the present invention as in (1) above, is suited for mass production by an injection molding process.

(3) According to a third aspect of the present invention, the optical prism according to (1) is provided having projections outwardly projecting from the receded surfaces at a predetermined position thereof.

Heretofore, no optical prism of this type has been proposed, which has a specific shape which permits size reduction of its entirety even in the case where projections are provided as portions for positioning it and the display or the like and also maintaining the relative positions of these components.

According to the present invention as in (3) above, the receded surfaces do not impede the effective size optical path of light from the display or like light source, and can be utilized for providing projections serving as portions for positioning the optical prism and the display or the like relative to each other and also maintaining the relative positions of these components. Besides, the size reduction is less impeded by the projections even though these projections outwardly project from the receded surfaces.

(4) According to a fourth aspect of the present invention, there is provided the optical prism according to (3), which is fabricated by an injection molding process, and the projections of which have predetermined outer surface portions serving as eject pin contact surfaces in the injection molding process.

Heretofore, no specific means in the optical prism has been proposed that sets eject pin contact surfaces when fabricating the optical prism of this type in an injection molding process.

According to the present invention as in (4) above, in addition to the effect obtainable according to the present invention as in (3) above, the eject pin contact surfaces concerning the pertinent injection molding process are set on predetermined portions of the projection surfaces. Thus, any push flaw by the eject pin in forced contact will not deteriorate the performance of the optical prism utilizing the optical properties thereof.

(5) According to a fifth aspect of the present invention, there is provided the optical prism according to (3), wherein the projections include frame portions for holding the display or the like and positioning portions for determining the position of the display or the like relative to the optical prism.

Heretofore, no optical prism of this type has been proposed, in which the projections do not impede the size reduction of its entirety even if they are utilized as positioning portions for determining the positions of a frame member supporting the display or the like and relative to each other.

According to the present invention as in (5) above, the projections which are provided by utilizing the receded surfaces, in addition to the effect obtainable according to the present invention as in (3) above, less impede the size reduction even if they are utilized as positioning portions for determining the positions of a frame member supporting the display or the like and the optical prism, because the extent of their projection can be controlled by the receded surfaces.

(6) According to a sixth aspect of the present invention, there is provided the optical prism according to (5), wherein the projections each have one or more flat portions, some of the flat portions being substantially parallel at a perpendicular to display mounting surfaces formed on the frame portions.

Heretofore, no optical prism of this type has been proposed, which has a specific structure for ensuring necessary accuracy of positioning of it and a display relative to each other.

According to the present invention as in (6) above, in addition to the effect obtainable according to the present invention as in (5) above, it is possible to readily ensure necessary accuracy of positioning of the optical prism and the display relative to each other.

(7) According to a seventh aspect of the present invention, there is provided the optical prism according to (5), wherein the projections have one or more flat surfaces, one of the flat surfaces being a positioning surface having a greater area than an opposite surface behind it, side surfaces defined between the positioning surface and the opposite surface being formed such that they have a predetermined die removal slope suited for injection molding in the fabrication of the optical prism.

Heretofore, no specific structure of this type has been proposed which permits readily ensuring necessary accuracy of positioning of the optical prism and the display relative to each other and also readily fabricating the optical prism by injection molding.

According to the present invention as in (7) above, in addition to the effect obtainable according to the present invention as in (5) above, it is possible to permit readily ensuring necessary accuracy of positioning of the optical prism and the display relative to each other and also readily fabricating the optical prism by injection molding.

(8) According to an eighth aspect of the present invention, there is provided the optical prism according to (5), wherein the positioning portions have protruding or receding portions corresponding to receding or protruding portions of a frame member of the display or the like, the protruding or receding portions of the positioning portions having protrusions or depressions for restricting the release of their engagement with the receding or protruding portions of the frame member at least in a particular direction.

Heretofore, no specific structure of this type has been proposed, which permits readily ensuring necessary accuracy of positioning of the optical prism and the display relative to each other and also readily assembling the two components.

According to the present invention as in (8) above, in addition to the effect obtainable according to the present invention as in (5) above, it is possible to permit readily ensuring necessary accuracy of positioning of the optical prism and the display relative to each other and also readily assembling the two components.

(9) According to a ninth aspect of the present invention, there is provided the optical prism according to (8), wherein the protrusion or depressions are formed as ant protrusions or ant notches corresponding to ant notches or ant protrusions as receding or protruding portions of the frame member.

Heretofore, no specific structure of this type has been proposed, which permits readily ensuring necessary accuracy of positioning of the optical prism and the display relative to each other and also readily assembling the two components.

According to the present invention as in (9) above, in addition to the effect obtainable according to the present invention as in (8) above, it is possible to permit readily ensuring necessary accuracy of positioning of the optical prism and the display relative to each other and also readily assembling the two components.

(10) According to a tenth aspect of the present invention, there is provided the optical prism according to (8), wherein the positioning portions have elastic force receiving surfaces in contact with and receiving elastic forces of elastic pieces, which are provided on the frame member such as to suppress displacement of the frame member relative to the positioning portions by elastic forces induced by their own elastic deformation.

Heretofore, no specific structure of this type has been proposed, which permits readily ensuring necessary accuracy of positioning of the optical prism and the display relative to each other and also readily assembling the two components.

According to the present invention as in (8) above, in addition to the effect obtainable according to the present invention as in (5) above, it is possible to permit readily ensuring necessary accuracy of positioning of the optical prism and the display relative to each other and also readily assembling the two components.

(11) According to an eleventh aspect of the present invention, there is provided an optical prism for reflecting incident light from an incidence surface suited for incidence of light from predetermined display or like light source for at least twice before emitting the reflected light as emission light through a predetermined emission surface, wherein: the optical prism has side surfaces crossing the incidence and emission surfaces and including receded surfaces formed such as not to impede an optical path of an effective size, the incident light being led along the optical path from the incidence surface to the emission surface, and predetermined areas of the receded surfaces being provided with a surface roughening treatment or like surface treatment.

Heretofore, no specific arrangement for effectively evading ghost generation due to light side-wise entering the effective size optical path in the optical prism from the incidence surface to the emission surface has been proposed.

According to the present invention as in (11) above, light is prevented from side-wise entering the effective size optical path in the optical prism from the incidence surface to the emission surface, thus preventing the image viewing quality from being spoiled by ghost effects.

(12) According to a twelfth aspect of the present invention, there is provided the optical prism according to (11), which is fabricated by an injection molding process, in which the surfaces provided with the roughening surface treatment or like surface treatment have a die removal slope of 3 to 20 degrees with respect to a die removal direction in a pertinent injection molding process.

Heretofore, no specific proposal of this type was made, which permits improving the processibility of fabrication of the optical prism by an injection molding process.

According to the present invention as in (12) above, in addition to the effect obtainable according to the present invention as in (11) above, it is possible to improve the processibility of fabrication of the optical prism particularly in an injection molding process.

(13) According to a thirteenth aspect of the present invention, there is provided an optical prism for reflecting incident light from an incidence surface suited for incidence of light from predetermined display or like light source for at least twice before emitting the reflected light as emission light through a predetermined emission surface. The incidence and emission surfaces and also the reflecting surfaces concerning the reflection are subustantially quadrilateral as defined by their edges.

Heretofore, no specific proposal of this type has been made, which permits ensuring necessary die processing accuracy when fabricating the optical prism by an injection molding process.

According to the present invention as in (13) above, it is possible to permit readily ensuring necessary die processing accuracy when fabricating the optical prism by an injection molding process and thus readily ensuring necessary processing accuracy of the optical prism itself.

(14) According to a fourteenth aspect of the present invention, there is provided an optical prism for reflecting incident light from an incidence surface suited for incidence of light from predetermined display or like light source for at least twice before emitting the reflected light as emission light through a predetermined emission surface. The optical prism is fabricated by an injection molding process, and a reference axis of either one of the incidence surface, emission surface and reflecting surfaces and a die removal direction in a pertinent injection molding process are subustantially parallel to each other.

Heretofore, no specific proposal of this type has been made, which permits improving the processibility of fabrication of the optical prism by an injection molding process.

According to the present invention as in (12) above, in addition to the effect obtainable according to the present invention as in (11) above, it is possible to improve the processibility of fabrication of the optical prism particularly in an injection molding process.

(15) According to a fifteenth aspect of the present invention, there is provided an optical prism for reflecting incident light from an incidence surface suited for incidence of light from predetermined display or like light source for at least twice before emitting the reflected light as emission light through a predetermined emission surface. The optical prism is fabricated by an injection molding process, and a die split line in the injection molding process does not pass through the incidence and emission surfaces, the reflecting surfaces and the edges of these surfaces except for the edge defining the incidence and emission surfaces adjacent to each other and the edge defining the reflecting surfaces adjacent to each other.

Heretofore, there has been no specific means for avoiding size increase of the optical prism while ensuring the effective optical size thereof when fabricating the optical prism by an injection molding process.

According to the present invention as in (15) above, a die removal slope when fabricating the optical prism by an injection molding process is provided on two optical surfaces with respect to a die split line, and it is thus possible to avoid size increase of the optical prism while ensuring the effective optical size.

(16) According to a sixteenth aspect of the present invention, there is provided an optical prism for reflecting incident light from an incidence surface suited for incidence of light from a predetermined display or like light source for at least twice before emitting the reflected light as emission light through a predetermined emission surface. The optical prism is fabricated by an injection molding process, and a die split line concerning the injection molding process passes through projections outwardly projecting form side surfaces crossing the incidence and emission surfaces and formed at adequate transversal positions.

Heretofore, no specific structure of this type has been proposed, which is suited for forming, when fabricating the optical prism by an injection molding process, portions for positioning the optical prism and the display or the like relative to each other and also maintaining the relative positions of these components.

According to the present invention as in (16), it is possible to readily form, when fabricating the optical prism by an injection molding process, the portions for positioning the optical prism and the display or the like relative to each other and also maintaining the relative positions of these components.

(17) According to a seventeenth aspect of the present invention, there is provided the optical prism according to (16), wherein the projections have positioning regulation portions formed in their predetermined portions and for regulating the positioning of a frame member supporting the display or the like, the die slit line passing through predetermined surface portions of the positioning regulation portions.

Heretofore, no specific structure has been provided, which can ensure a sufficient area as a predetermined area of a positioning regulation portion for regulating the positioning of a frame member supporting the display or the like.

According to the present invention as in (17) above, in addition to the effect obtainable according to the present invention as in (16) above, the predetermined area of the positioning regulation portion for regulating the positioning of the frame member supporting the display or the like, is not restricted by the die removal slope necessary for fabricating the optical prism by an injection molding process, and it is thus possible to readily ensure a sufficient area.

(18) According to an eighteenth aspect of the present invention, there is provided the optical prism according to (17), wherein predetermined surface portions of the projections other than the positioning regulation portions are set as eject pin contact surfaces concerning a pertinent injection molding process.

Heretofore, no specific proposal of how to set an eject pin contact surface concerning a pertinent injection molding process has been made.

According to the present invention as in (18) above, a predetermined portion of the projection surface is set to be an eject pin contact surface in the pertinent injection molding process, and even a push flaw produced by the eject pin in forced contact will not deteriorate the performance of the optical prism utilizing optical properties thereof.

(19) According to a nineteenth aspect of the present invention, there is provided the optical prism for reflecting incident light from an incidence surface suited for incidence of light from a predetermined display or like light source for at least twice before emitting the reflected light as emission light through a predetermined emission surface. The incidence and emission surfaces and the reflecting surfaces as optical surfaces have flat surfaces of 1 millimeter or more in diameter formed outside effective size areas.

Heretofore, no specific proposal of the structure permitting measurement for ensuring the accuracy of the shape and dimensions of the optical prism has been made.

According to the present invention as in (19) above, the angular eccentricity of each optical surface of the optical prism can be measured by utilizing the flat surfaces of 1 millimeter or more formed outside the effective size areas. It is thus possible to ensure necessary accuracy of the shape and dimensions of the optical prism according to data of measurements.

(20) According to a twentieth aspect of the present invention, there is provided an optical prism for reflecting incident light from an incidence surface suited for incidence of light from predetermined display or like light source for at least twice before emitting the reflected light as emission light through a predetermined surface. Portions including predetermined portions having Imaginary edges defined between adjacent imaginary surface portions of the incidence and emission surfaces adjacent to each other, and the reflecting surfaces adjacent to each other, except for effective size areas of these surfaces, are chamfered.

Heretofore, no specific structure of this type has been proposed, which permits minimizing the size and weight of the optical prism.

According to the present invention as in (20) above, it is possible to yet minimize the size and weight of the optical prism.

(21) According to a twenty first aspect of the present invention, there is provided the optical prism according to (20), which is fabricated by an injection molding process, and in which a die split line concerning the injection molding process passes through the chamfered portions.

Heretofore, no specific structure of this type has been proposed, which permits minimizing the size and weight of the optical prism.

According to the present invention as in (20) above, it is possible to yet minimize the size and weight of the optical prism.

(22) According to a twenty second aspect of the present invention, there is provided an optical prism for reflecting incident light from an incidence surface suited for incidence of light from predetermined display or like light source for at least twice before emitting the reflected light as emission light through a predetermined emission surface. Pertinent ones of the incidence and emission surfaces and reflecting surfaces as optical surfaces have indexes formed at predetermined positions or optical on optical axis.

Heretofore, no specific proposal of the structure permitting measurement for ensuring the accuracy of the shape and dimensions of the optical prism has been made.

According to the present invention as in (22) above, the indexes can be utilized for measuring the position relation and angular eccentricity of the optical surfaces of the optical prism. It is thus possible to ensure the accuracy of the shape and dimensions of the optical prism according to data of measurements.

Other objects and features will be clarified from the following description with reference to attached drawings.

BRIEF DESCRIPTION OF THE DRAWINGS

FIGS. 1A to 1C are perspective views showing an embodiment of the optical prism according to the present invention;

FIGS. 6A and 6B are views illustrating a manner of assembling of an optical prism 1 and an associated casing 30, like those described before in connection with FIGS. 1A to 1C to 5;

FIGS. 8A and 8B are views showing a further example of the manner of assembling of an optical prism 1 and an associated casing 30, like those described before in connection with FIGS. 1A to 1C to 7;

FIGS. 9A and 9B are views showing a still further example of the manner of assembling an optical prism and an associated casing, like those described before in connection with FIGS. 1A to 1C to 8A and 8B;

FIGS. 13A and 13B are views for describing local surface treatment and die split line setting with an optical prism like that shown in FIGS. 12A and 12B;

FIGS. 16A to 16C show another embodiment of the present invention;

PREFERRED EMBODIMENTS OF THE INVENTION

Figure 2:
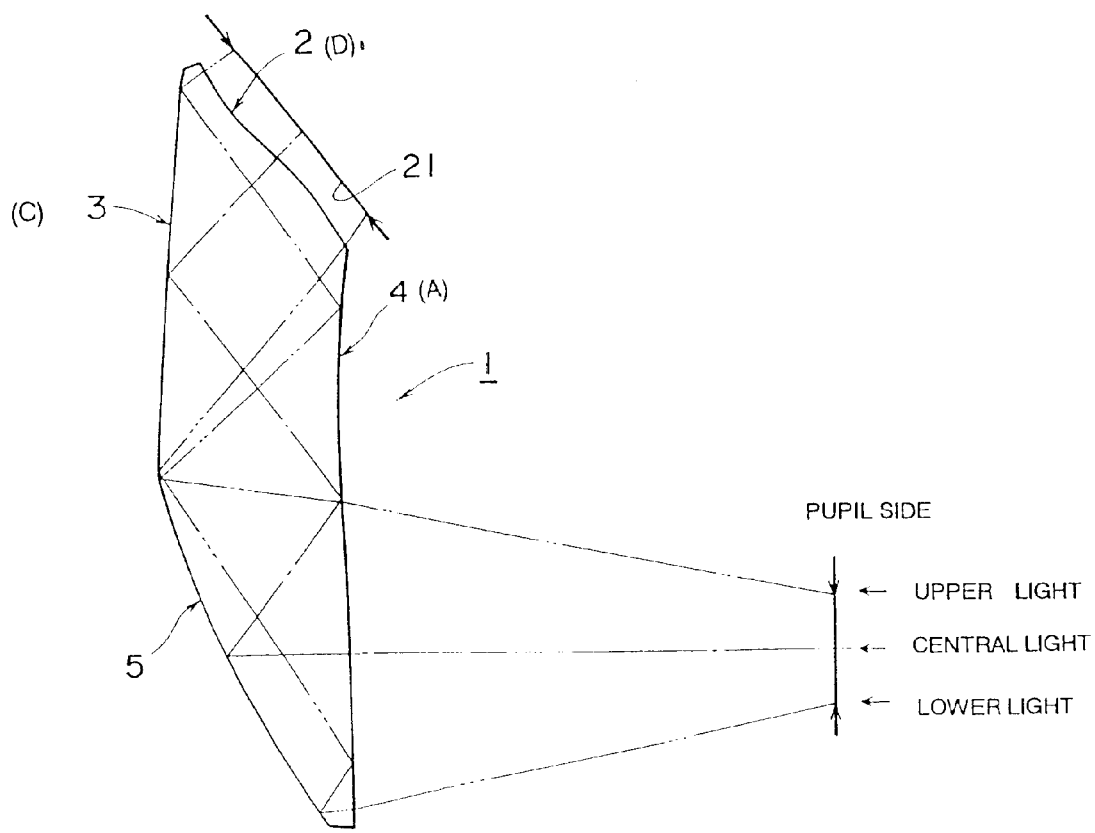
FIG. 2 is a view showing the optical path of an optical prism like that shown in FIGS. 1A to 1C.

Preferred embodiments of the present invention will now be described with reference to the drawings.

FIGS. 1A to 1C are perspective news showing an embodiment of the optical prism according to the present invention. The illustrated optical prism is a three-reflection prism for reflecting a light beam from an incidence surface three times before emission.

FIG. 1A is a perspective view showing the optical prism with an incidence surface and an emission surface (which are rear surfaces) viewed obliquely downward from behind. FIG. 1B is a perspective view showing the optical prism with inner reflection surfaces (which are front surfaces) viewed obliquely downward from ahead. FIG. 1C is a side view showing the optical prism viewed in the width direction thereof.

Reference numeral 2 (see FIG. 1A) designates a rearwardly inclined one of two surfaces defining the top edge of the optical prism 1. This surface 2 is an incidence surface (facing a display, such as an LCD, hereinafter referred to as D surface) which is formed such as to be suitable for incidence of light from the display. Reference numeral 3 (see FIG. 1B) designates a forwardly inclined one of two surfaces defining the top edge of the optical prism 1. This surface 3 is an inner surface serving as a reflecting surface (hereinafter referred to as C surface), at which light beam from the D surface is reflected for the first time in the optical prism 1. Reference numeral 4 (see FIG. 1A) is a rear surface downwardly extending from a lower edge of the D surface 2. This surface 4 is an emission surface (hereinafter referred to as A surface). The inner side of the A surface 4 is a reflection surface, at which light beam having been reflected for the first time at the C surface 3 is reflected for the second time in the optical prism 1. Reference numeral 5 designates a front surface extending downward from a lower edge of the C surface 3. The inner side of this surface 5 is a reflecting surface (hereinafter referred to as B surface), at which the light beam having been reflected for the second time at the inner side of the A surface 4 is reflected for the third time in the optical prism 1. The D, C, A and B surfaces 2, 3, 4 and 5 are curved surfaces formed such as to satisfy necessary optical characteristics.

Left and right side surfaces 6L and 6R are formed such that they cross the incidence and emission surfaces (i.e., D and A surfaces 2 and 4). Recessed surfaces 7L and 7R are formed on the sides of the two side surfaces 6L and 6R such that they do not interfere with an optical path of an effective size, along which the incident light is led from the incidence surface (i.e., D surface 2) to the emission surface (i.e., A surface 4). In the example shown in FIGS. 1A to 1C, a left and a right step surfaces 8L and 8R are formed such that they terminate in the receded surfaces 7L and 7R. By these step surfaces 8L and 8R, an upper part of the optical prism 1 with front and rear surfaces thereof constituted by the C and D surfaces 3 and 2 is made narrower than a lower part of the optical prism 1 with front and rear surfaces constituted by the B and A surfaces 5 and 4.

Side projections 9L and 9R outwardly project from the receded surfaces 7L and 7R such that they extend beyond the left and right side surfaces 6L and 6R.

Three over-flow extensions 1b downwardly extend from the lower part of the optical prism 1 with the front and rear surfaces constituted by the B and A surfaces 5 and 4. These over-flow extensions 1b are formed when fabricating the optical prism 1 by an injection molding process.

As has been described above in connection with FIGS. 1A to 1C, the incidence and emission surfaces (i.e., D and A surfaces 2 and 4) and the reflecting surfaces (i.e., B and C surfaces 5 and 3), are substantially quadrilateral as defined by their edges. Thus, it is possible to readily ensure necessary die processing accuracy when molding the optical prism by injection molding process and readily ensure necessary processing accuracy of the optical prism itself.

FIG. 2 is a view showing the optical path of an optical prism like that shown in FIGS. 1A to 1C. In FIG. 2, parts like those shown in FIGS. 1A to 1C are designated by like reference numerals and symbols. A manner in which light beams are incident from a display face (or like source) 21 of a display (for instance an LCD) and emitted to the pupil side are depicted by three chain lines.

Figure 3:
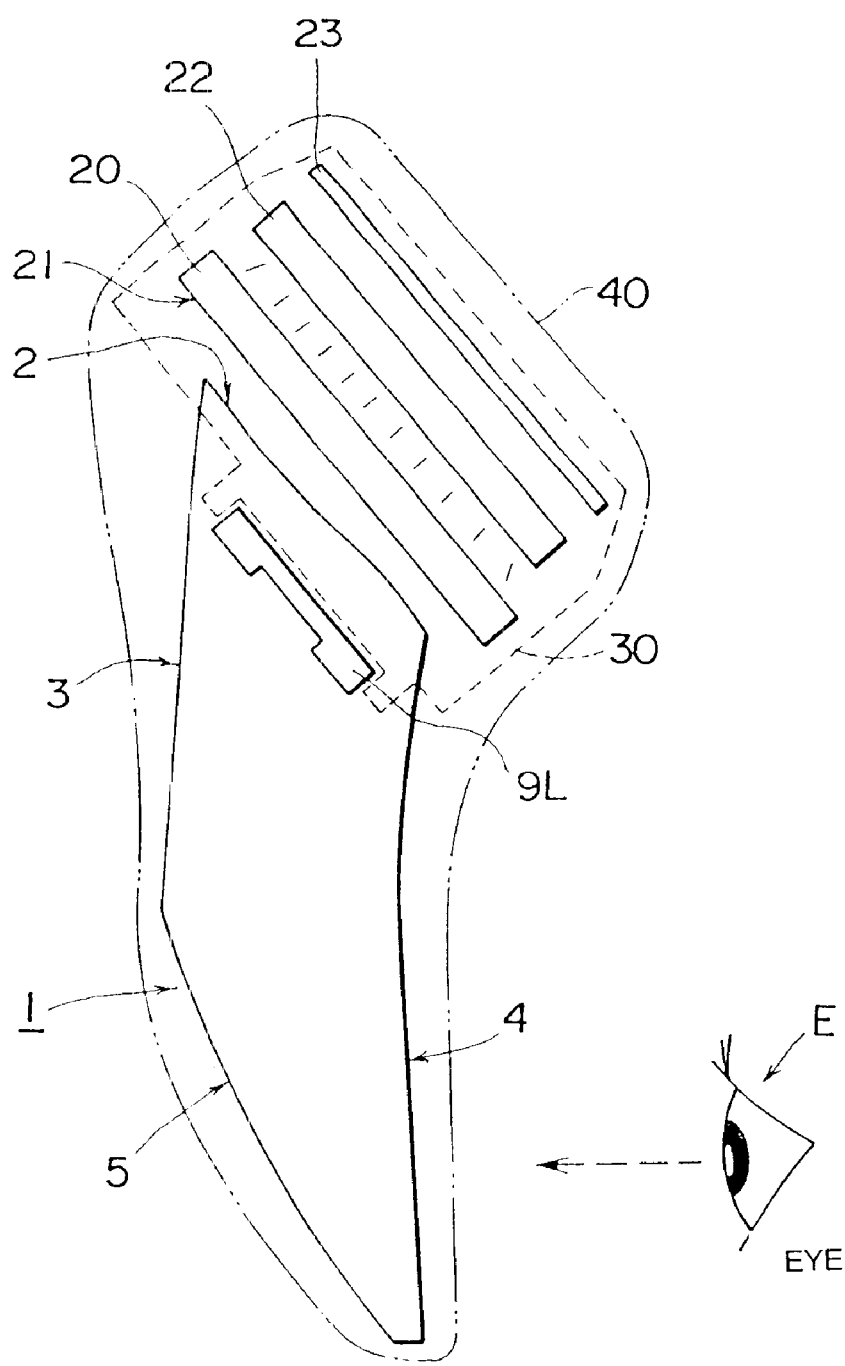
FIG. 3 is a schematic view showing an optical prism like that shown in FIGS. 1A to 1C, which is mounted together with a display and related components in a case 40.

FIG. 3 is a schematic view showing an optical prism like that shown in FIGS. 1A to 1C, which is mounted together with a display and related components in a case 40. In FIG. 3, parts like those shown in FIGS. 1A to 1C are designated by like reference numerals and symbols. An LCD 20 as a display having a display face 21 does display operation by receiving illumination light from a backlight 22 disposed behind it. Behind the backlight 22 is disposed a circuit board 23, on which drive system circuits for the LCD 20 and the backlight 22 are mounted. The LCD 20, the backlight 22 and the circuit board 23 are assembled in a casing 30 as shown by dashed rectangle. As will be described later in detail, the casing 30 is positioned relative to and secured to the optical prism 1 by the side projection 9L noted above.

Figure 4:
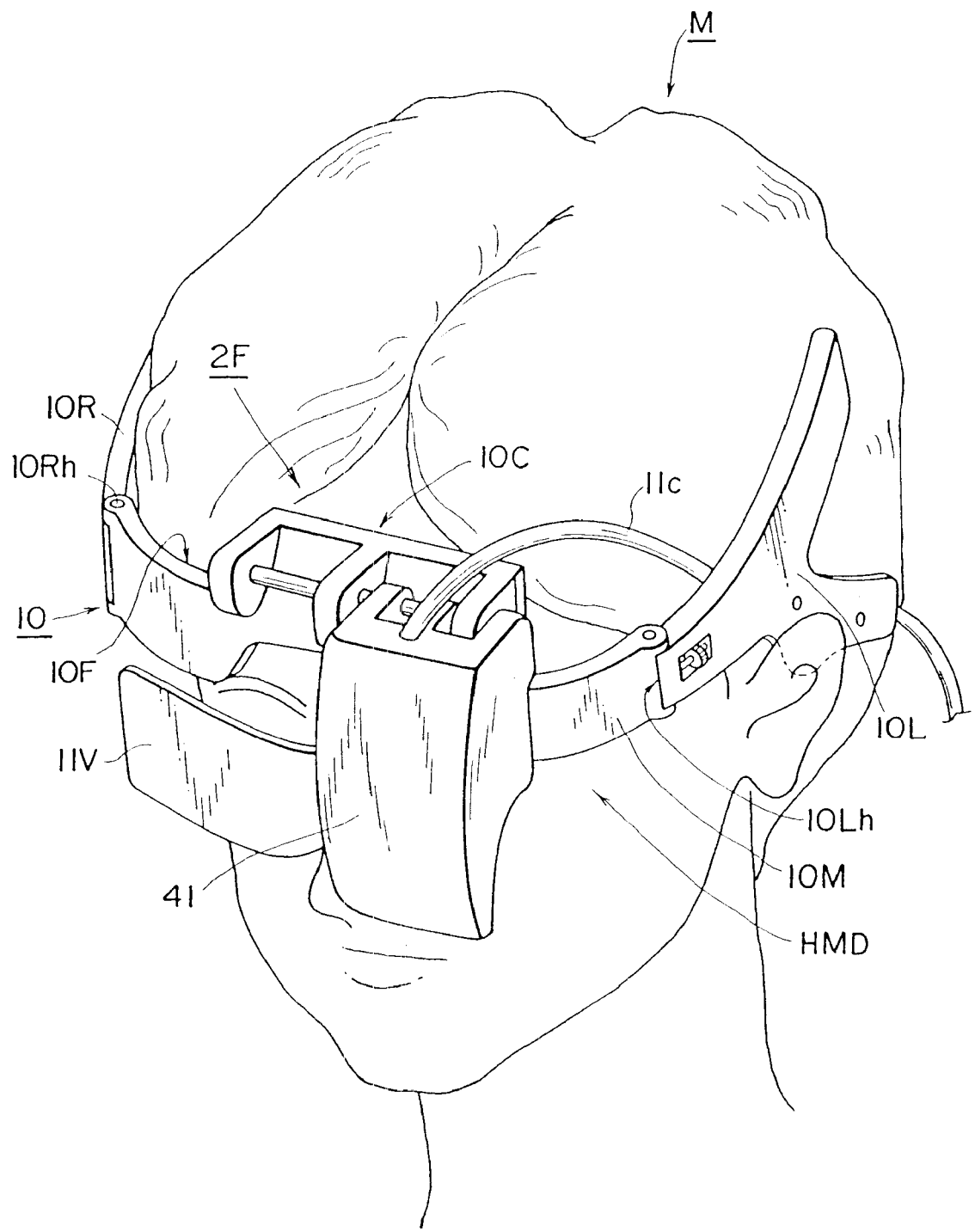
FIG. 4 is a view showing a viewer bearing a single-eye viewing head mounted device (HMD) comprising an image display unit 41, which includes an optical system for display, constructed by using the optical prism according to the present invention.

FIG. 4 is a view showing a viewer bearing a single-eye viewing head mounted device (HMD) comprising an image display unit 41, which includes an optical system for display, constructed by using the optical prism according to the present invention.

With reference to the Figure, the HMD has a frame 10, which is assembled from a main frame 10M which is found at a position to be in contact with the head 2F of the viewer M when the HMD is mounted and constitutes a main part thereof, and a left and a right hinge 10Lh and 10Rh, respectively, to the main frame 10M.

Provided on an upper portion of the main frame 10M is a coupling mechanism 10C, which suspends the image display unit 41 at a predetermined position. The image display unit 41 displays on its display section images supplied to it via a cord 11c as an image signal transmission line. In this embodiment, the image display unit 41 has a visor 11V, which restricts the visible light permeability concerning the forward visual field of the eye not for image viewing with the image display unit to 70 percent or below, so that image viewing may be made without being Interrupted. In other words, the visor 11V effectively suppresses visual field struggle between the two eyes at the time of the image viewing.

The main frame 10M includes a head push member 10F, which is held in forced contact with front head portion 2F or a nearby portion of the viewer M with a predetermined force applied in a direction substantially normal to that portion, thus restricting relative movements of it and that head portion of the viewer M in contact with each other.

As shown above, in this embodiment of the HMD the frame 10 is held at a prescribed position relative to the head of the viewer M by elastic forces of itself as a whole. The frame 10 thus uses no separate spring or like elastic member and is simplified in construction, thus readily permitting size and weight reductions.

In this embodiment, the above elastic forces are obtained by using a plastic material selected from the group consisting of polyamide, polycarbonate, polypropyrene, ABS, polyethylene, polyethylene telephthalate and polyacetal for the left and right rear frames 10L and 10R.

For the main frame 10M a carbon-containing engineering plastic material is used.

By using the above materials for the frame 10, sufficient elastic forces for obtaining an adequate position restricted state can be obtained. In addition, by using the carbon-containing engineering plastic material, it is possible to obtain excellent rigidity and also reduce the possibility of distortion of the frame during image viewing and hindering thereof.

The left and right rear frames 10L and 10R are coupled to the main frame 10M by flexible coupling mechanisms. That is, as described before, in this embodiment the left and right rear frames 10L and 10R are hinged by the hinges 10Lh and 10Rh which serve as the coupling mechanisms to the main frame 10M.

Figure 5:
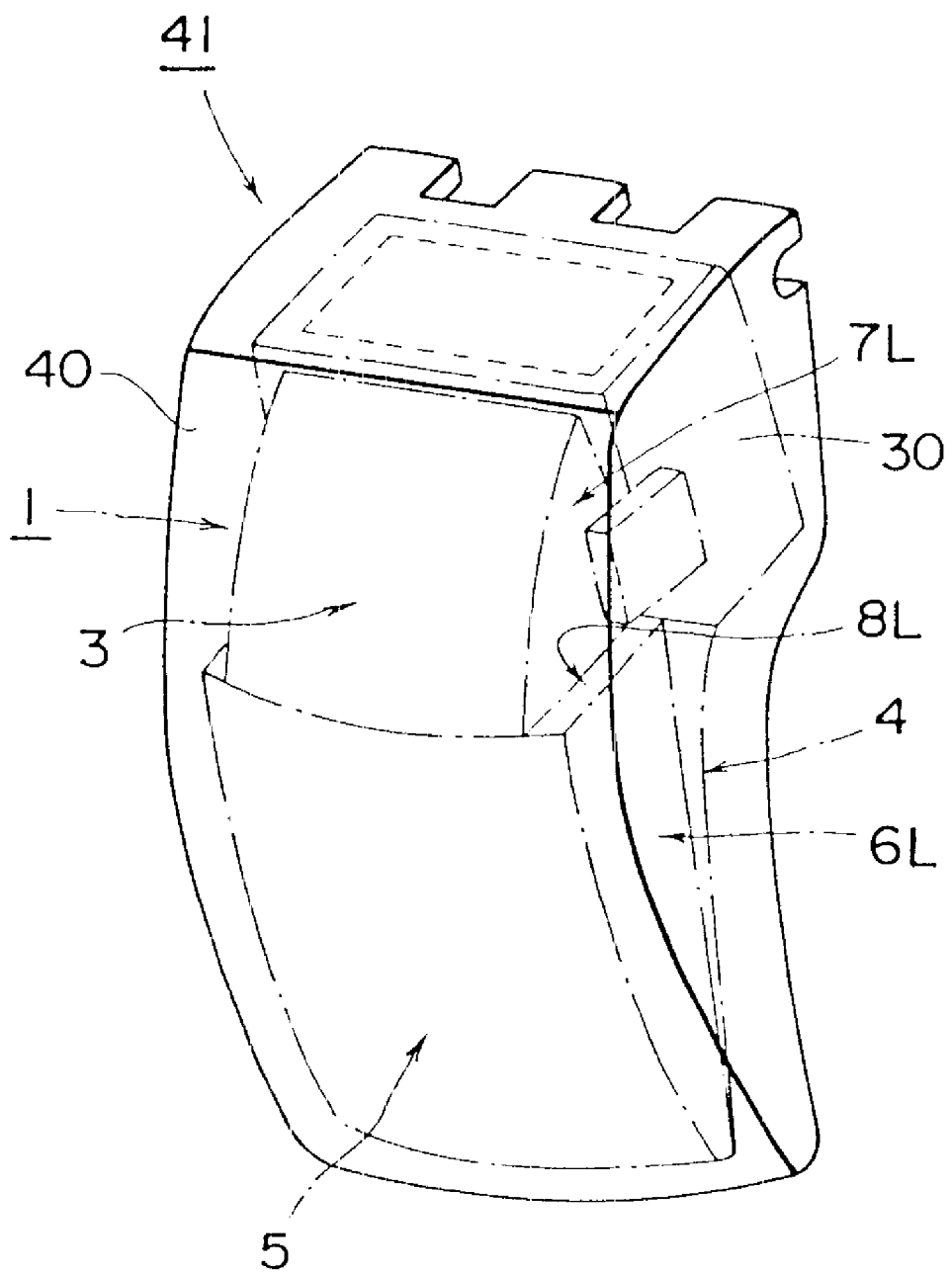
FIG. 5 is a schematic view showing the image display unit 41 accommodating the optical system for display constructed by employing the optical system 1 according to the present invention, the unit 41 being used in the single-eye viewing HMD as described before in connection with FIG. 4.

FIG. 5 is a schematic view showing the image display unit 41 accommodating the optical system for display constructed by employing the optical system 1 according to the present invention, the unit 41 being used in the single-eye viewing HDM as described before in connection with FIG. 4. In FIG. 5, parts like those in FIGS. 1A to 1C to 4 are designated by like reference numerals and symbols, while omitting their detailed description.

In this example, the image display unit 41 has a case 40, which is mounted on the frame 10 (i.e., the coupling mechanism 10C thereof) to obtain the HMD as shown in FIG. 4.

FIGS. 6A and 6B are views illustrating a manner of assembling of an optical prism 1 and an associated casing 30, like those described before in connection with FIGS. 1A to 1C to 5.

FIG. 6A is a perspective view showing the optical prism 1 and the casing 30 having been assembled together. FIG. 6B is an exploded perspective view showing the optical prism 1 and the casing 30 separately.

In FIGS. 6A and 6B, parts like those described before in connection with FIGS. 1A to 1C to 5 are designated by like reference numerals and symbols, while omitting their detailed description.

As shown, the casing 30 is a hollow rectangular body having optical system mounting members 31L and 31R outwardly projecting from the opposite sides. The optical system mounting members 31L and 31R have substantially central, through threaded holes 32L and 32R penetrating them in the forward/rearward direction. The optical prism 1 has projections 9L and 9R provided on receded surfaces 7L and 7R. The projections 9L and 9R have through holes 9Lh and 9Rh (not shown) penetrating them in the forward/rearward direction. The through holes 9Lh and 9Rh can be aligned to the through threaded holes 32L and 32R. The projections 9L and 9R of the optical prism 1 and the optical system mounting members 31L and 31R of the casing 30 are coupled to one another by a screw 50L, which is passed through the through hole 9Lh and screwed through the through-threaded hole 32L, and another screw 50R (not shown), which is passed through the through hole 9Rh and screwed through the through-threaded hole 32R. In this way, the associated parts are positioned relative to one another. The optical system mounting members 31L and 31R have depressions corresponding to the projections 9L and 9R of the optical prism 1. The projections 9L and 9R can be snugly fitted in the depressions, whereby the optical prism and the casing are positioned relative to each other in the forward/rearward, transversal and vertical directions.

Figures 7A, 7B, 7C:
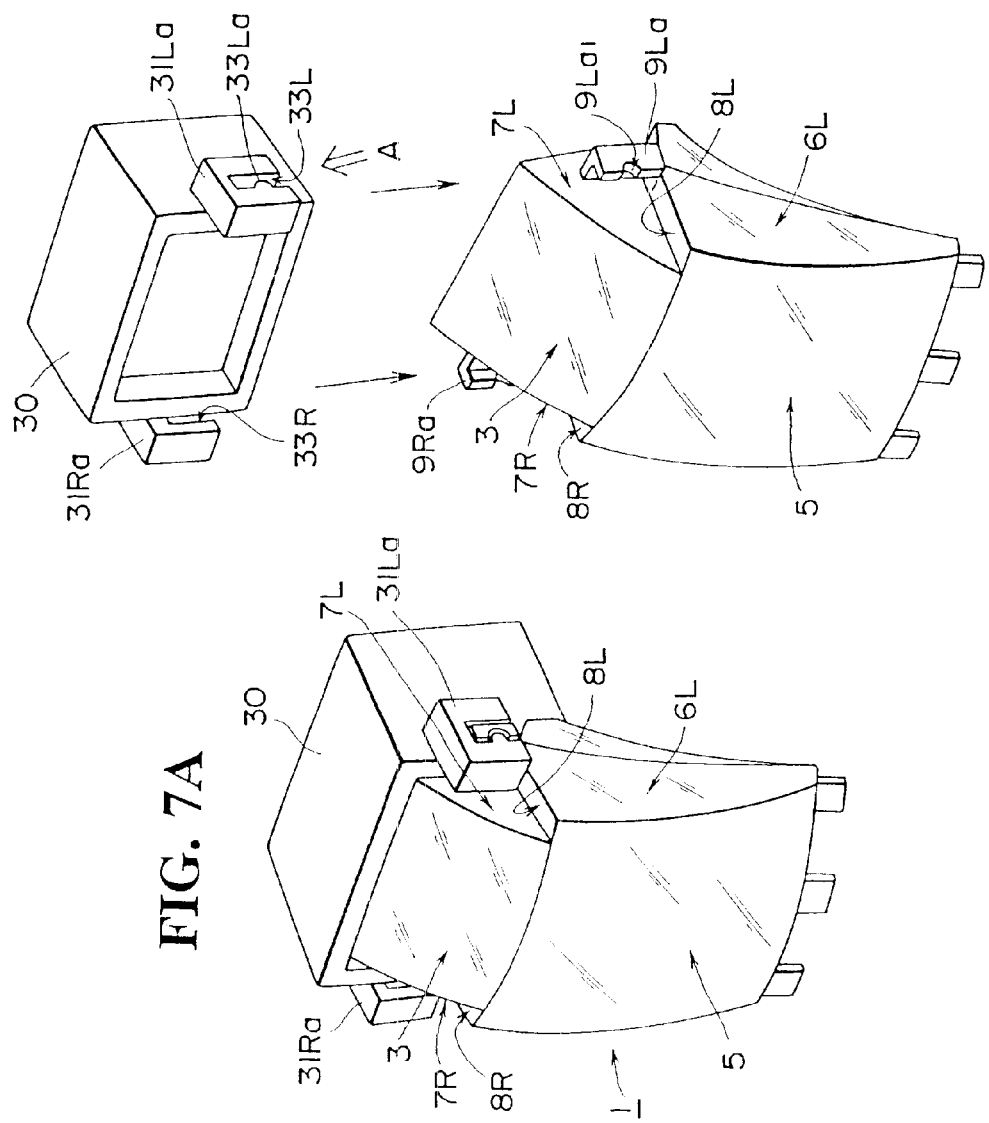
FIGS. 7A to 7C are views illustrating a different example of the manner of assembling an optical prism 1 and an associated casing 30, like those described before in connection with FIGS. 1A to 1C to 6A and 6B.

FIGS. 7A to 7C are views illustrating a different example of the manner of assembling an optical prism 1 and an associated casing 30, like those described before in connection with FIGS. 1A to 1C to 6A and 6B.

FIG. 7A is a perspective view showing the optical prism 1 and the casing 30 having been assembled together. FIG. 7B is an exploded perspective view showing the optical prism 1 and the casing 30 separately. FIG. 7C is an enlarged-scale fragmentary sectional view taken in the direction of arrow A in FIG. 7B.

In FIGS. 7A to 7C, parts like those described before in connection with FIGS. 1A to 1C to 6A and 6B are designated by like reference numerals and symbols, while omitting their detailed description.

As shown, the casing 30 is a hollow rectangular shape having optical system mounting members 31La and 31Ra outwardly projecting from opposite sides. The optical system mounting members 31La and 31Ra have notches 33L and 33R cut from the bottom and also protuberances 33La and 33Ra projecting into the notches 33L and 33R at a vertical intermediate level position thereof and serving as positioning click mechanisms.

The optical prism 1 has projections 9La and 9Ra provided on receded surfaces 7L and 7R. The projections 9La and 9Ra are complementary in phase to the notches 33L and 33R, having depressions 9La1 and 9Ra1 formed substantially at in intermediate level position corresponding to the protuberances 33La and 33Ra as the positioning clock mechanisms. When the projections 9La and 9Ra of the optical prism 1 are engaged in the notches 33L and 33R of the optical system mounting members 31La and 31Ra up to a regular position, the protuberances 33La and 33Ra as the positioning click mechanisms are click engaged snugly and elastically in the depressions 9La1 and 9Ra1 of the projections 9La and 9Ra of the optical prism 1. In this way, the associated parts are reliably positioned relative to one another in the forward/rearward, transversal and vertical directions. It is thus possible to obtain ready assembling without use of any screw or other separate member. From FIG. 7C which is an enlarged-scale fragmentary sectional view taken in the direction of arrows A in FIG. 7B, the manner of engagement between the projection 9La of the optical prism 1, projecting upwardly or in the form of letter L when viewed upwardly, and the associated notch 33L of the optical system mounting member 31La.

It will be understood from the above description with reference to the drawings and also illustrations thereof that, the projections 9L and 9R, or 9La and 9Ra, have one or more flat portions, some of which are substantially parallel or perpendicular to a display mounting surface formed in the casing 30 as a frame member. It is thus possible to readily ensure necessary accuracy of positioning of the optical prism and the display relative to each other.

The positioning function portions of the optical prism 1 concerning the above positioning of the associated parts, has protruding or receding portions corresponding to receding or protruding portions formed on the side of the frame member or casing 30, and such protruding or receding portions have protuberances or depressions for restricting the releasing of their engagement with the associated receding or protruding portions on the side of the frame member or casing 30 at least in a particular direction. It is thus possible to readily ensure necessary accuracy of positioning of the optical prism and the display relative to each other, while permitting ready assembling of the optical prism and the display.

The above protuberances or depressions may be formed as ant protuberances or ant notches corresponding to ant notches or ant protuberances formed as the receding or protruding portions on the side of the frame member or casing 30. Again with this arrangement it is possible to readily ensure necessary accuracy of positioning of the optical prism and the display relative to each other, while permitting ready assembling of the optical prism and the display.

FIGS. 8A and 8B are views showing a further example of the manner of assembling of an optical prism 1 and an associated casing 30, like those described before in connection with FIGS. 1A to 1C to 7.

FIG. 8A is a perspective view showing the optical prism 1 and the casing 30 having been assembled together. FIG. 8B is an exploded perspective view showing the optical prism 12 and the casing 30 separately.

In FIGS. 8A and 8B, parts like those described before in connection with FIGS. 1A to 1C to 7, are designated by like reference numerals, while omitting their detailed description.

As shown, the casing 30 is a hollow rectangular body having optical system mounting member 31Lb and 31Rb projecting from the opposite sides. The optical system mounting members 31Lb and 31Rb have elastic portions 34L and 34R each formed by cutting two parallel notched from the front. These elastic portions 34L and 34R have inner protuberances 34Lb and 34Rb formed at their front or free end.

The optical prism 1 has projections 9La and 9Ra provided on receded surfaces 7L and 7R. The projections 9L and 9R have front depressions 9Lb and 9Rb formed at a vertically mid level position corresponding to the protuberances 34Lb and 34Rb of the optical system mounting members 31Lb and 31Rb. The protuberances 34Lb and 34Rb of the optical system mounting members 31Lb and 31Rb can be snugly and elastically click fitted in the depressions 9Lb and 9Rb of the projections 9La and 9Ra of the optical prism 1. It is thus possible to obtain reliable positioning in the forward/rearward, transversal and vertical directions and obtain ready assembling without use of any screw or like separate member.

FIGS. 9A and 9B are views showing a still further example of the manner of assembling an optical prism and an associated casing, like those described before in connection with FIGS. 1A to 1C to 8A and 8B.

FIG. 9A is a perspective view showing the optical prism 1 and the casing having been assembled together. FIG. 9B is an exploded perspective view showing the optical prism 1 and the casing 30 separately.

In FIGS. 9A and 9B, parts like those described before in connection with FIGS. 1A to 1C to 8A and 8B are designated by like reference numerals, while omitting their detailed description.

As shown, the casing 30 is a hollow rectangular body having optical system mounting members 31Lc and 31Rc projecting from the opposite sides. The optical system mounting members 31Lc and 31Rc have rectangular holes 35L and 35R formed near their front end. The optical system mounting members 31c and 31Rc are elastically coupled to the casing 30, or they are elastic in themselves.

The optical prism 1 has projections 9Lc and 9Rc formed on receded surfaces 7L and 7R. The projections 9Lc and 9Rc have a shape such that they can be snugly fitted in the rectangular holes 35L and 35R of the optical system mounting members 31Lb and 31Rb. The projections 9Lc and 9Rc can be snugly and elastically click fitted into the rectangular holes 35L and 35R of the optical system mounting members 31Lc and 31Rc of the casing 30. It is thus possible to obtain reliable positioning in the forward/rearward, transversal and vertical directions and obtain ready assembling without use of any screw or like separate member.

In the above examples shown in FIGS. 8A and 8B and also FIGS. 9A and 9B, the projections 9La and 9Ra or 9Lc an 9Lc serve as positioning members, and the elastic portions 34L and 34R as elastic members or the optical system mounting members 31Lb and 31Rb provided on the frame member or the casing 30 are engaged with the positioning members such as to prevent deviation from their positioned state relative to the positioners by their own elastic forces. Thus, it is possible to obtain reliable positioning in the forward/rearward, transversal and vertical directions and obtain ready assembling without use of any screw or like separate member.

Figure 10:
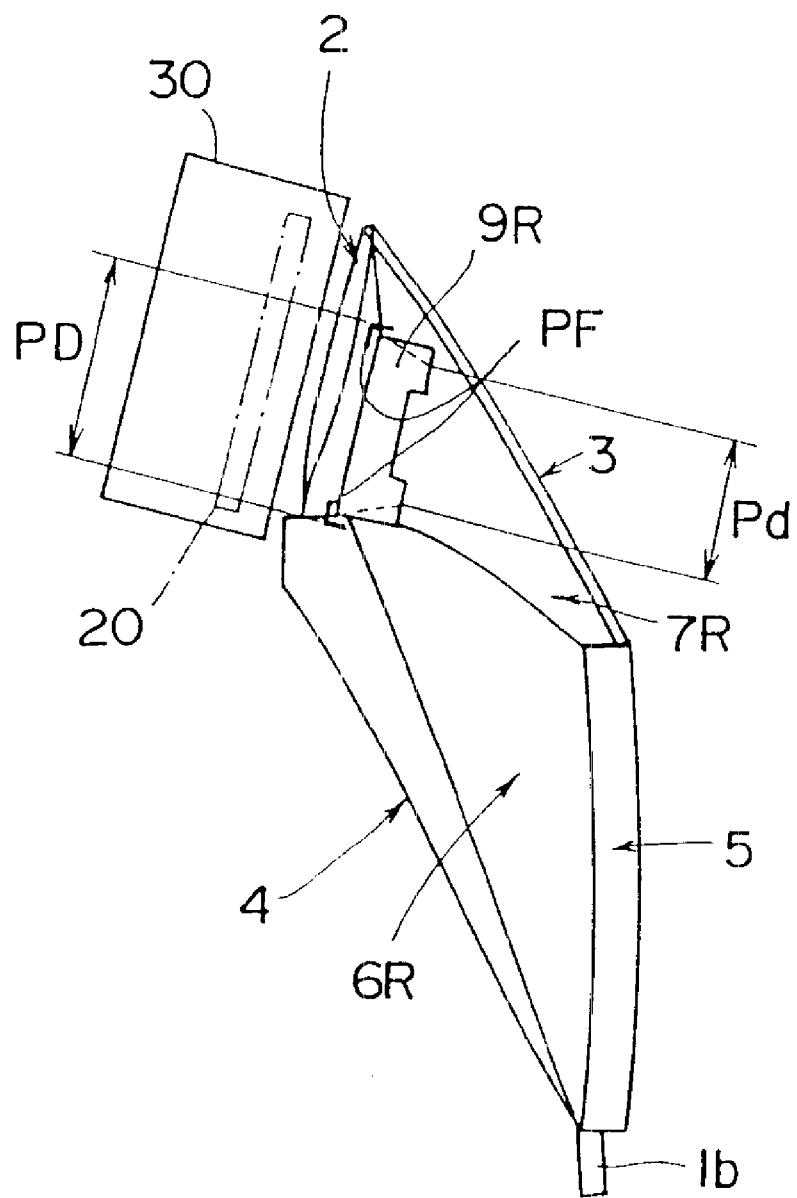
FIG. 10 is a side view for describing the shape and dimensions of the optical prism shown in FIGS. 1A to 1C.

FIG. 10 is a side view for describing the shape and dimensions of the optical prism shown in FIGS. 1A to 1C. In FIG. 10, parts like those shown in FIGS. 1A to 1C are designated by like reference numerals and symbols, while omitting their detailed description.

The D surface 2 which is formed such as to be suitable for incidence of light from the LCD 20 as display, faces and is parallel to the display face of the LCD 20. The surface of the projection 9R (and 9L as well) of the optical prism 1 that is in contact with the casing 30, serves as a positioning surface having a relatively large area. This surface faces and is parallel with the display face of the LCD 20 at a distance of 0.05 millimeter therefrom. The positioning surface of the projection 9R (and 9L as well) has opposite edges PF which are spaced apart a distance conforming to the corresponding dimension of the associated depression on the side of the casing 30. The surface on the side of the projection opposite the positioning surface has a relatively smaller area. That is, the distance Pd between the opposite edges of the opposite surface is smaller than the distance PD between the opposed edges PF of the positioning surface.

As shown, the projection 9R (and 9L as well) has one or more flat surfaces, one of which (i.e., the positioning surface between the edges PF, PF) has a greater area than the opposite surface behind it. With this configuration, the side surfaces that are defined between the positioning surface and the opposite surface therebehind have a predetermined die removal slope (i.e., a slope due to the difference between the distances PD and Pd) which is suited for the fabrication of the optical prism by injection molding.

With the structure as described above in connection with FIG. 10, it is possible to permit readily ensuring necessary accuracy of positioning of the optical prism 1 and the display 20 relative to each other and also readily fabricate the optical prism by injection molding.

Figure 11:
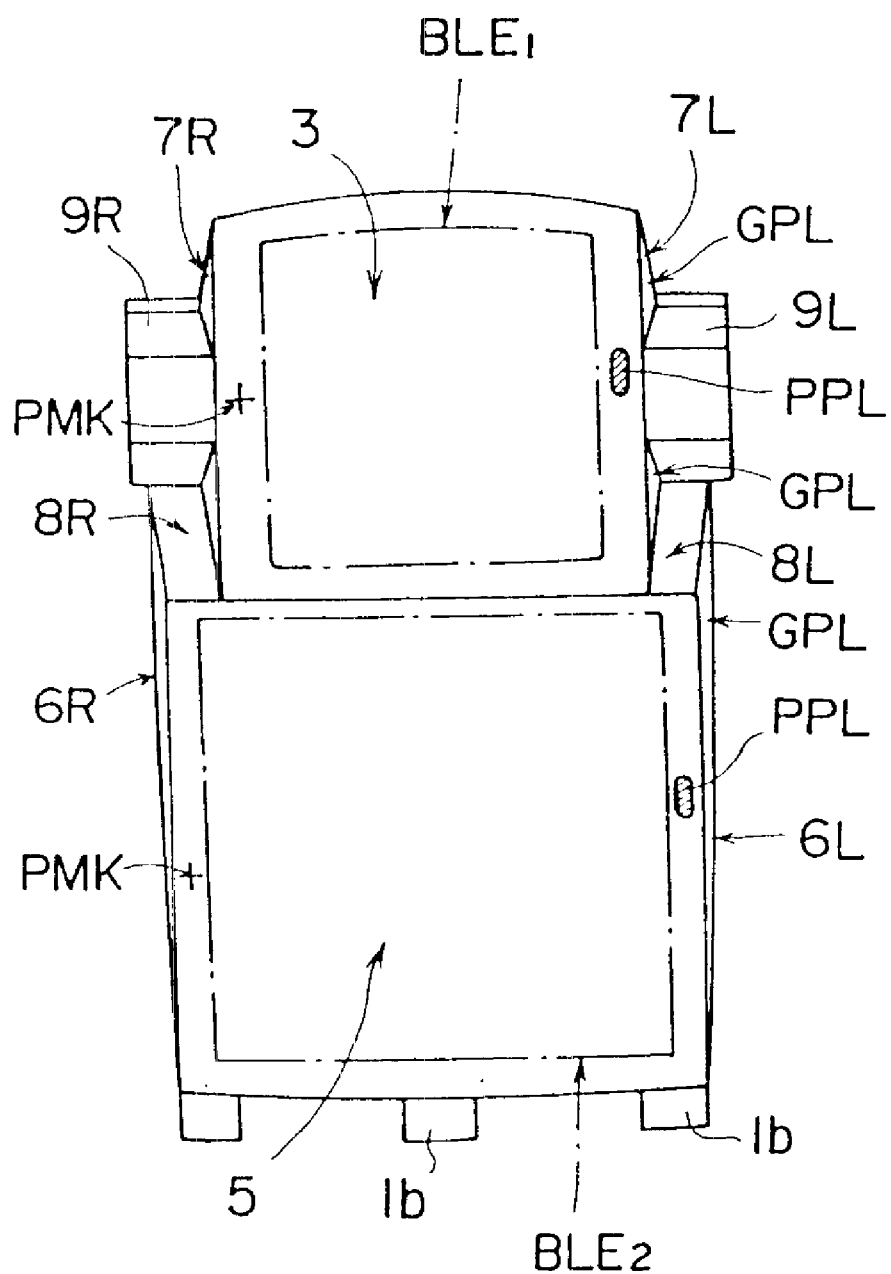
FIG. 11 is a front view for typically describing various features of the optical prism 1 according to the present invention.

FIG. 11 is a front view for typically describing various features of the optical prism 1 according to the present invention.

Referring to the Figure, areas or zones shown enclosed in phantom line rectangles BLE1 and BLE2 on the C and B surfaces 3 and 5, the areas being receded a predetermined dimension from the edges of the C and B surfaces 3 and 5, are effective size areas of the C and B surfaces 3 and 5. The phantom line rectangles BLE1 and BLE2 represent effective area boundaries. It will be seen from FIG. 11 that with the optical prism 1 according to the present invention, the recessed surfaces 7L and 7R are formed such that they do not impede the effective size optical path as shown enclosed within the phantom line rectangles BLE1 and BLE2.

In FIG. 11, the left side surface 6L has die removal slope GPL, which is provided when fabricating the optical prism 1 by injection molding. The right side surface 6R also has the same die removal slope. For obtaining satisfactory processibility, the die removal slope GPL is set to an angle of 1 to 10 degrees with respect to the direction of die removal in the pertinent injection molding process.

Of the surfaces of the projections 9L and 9R, which are formed such as to project from the receded surfaces 7L and 7R beyond the side surfaces 6L and 6R, some surface portions other than those used position regulating portions for regulating the position of the casing 30, are set as eject pin contact surfaces concerning the injection molding.

In this optical prism, flat surfaces PPL of 1 millimeter or more in diameter are further provided on the individual optical surfaces, i.e., the incidence and emission surfaces (i.e., D and A surfaces 2 and 4) and also reflecting surfaces (i.e., B and C surfaces 5 and 3), except for the effective size optical path areas thereof.

Such flat surfaces PPL may be utilized for measuring the angular eccentricity of the individual optical surfaces of the optical prism, and it is possible to ensure necessary accuracy of the shape and dimensions of the optical prism according to data obtained by the measurements.

In this optical prism, indexes (i.e., cross (+) position marks PMK in the case of FIG. 11) are provided on the individual optical surfaces, i.e., the incidence and emission surfaces (i.e., D and A surfaces 2 and 4) and reflecting surfaces (i.e., B and C surfaces 5 and 3), except for predetermined position and optical axis (that is, except for the effective size areas of the reflecting surfaces (i.e., B and C surfaces 5 and 3) in the case of FIG. 11).

Such indexes (or position marks) PMK may be utilized for measuring the positional relation and the angular eccentricity of the individual optical surfaces of the optical prism, and it is possible to ensure the shape and dimensions of the optical prism according to data obtained by the measurements.

Figure 12A:
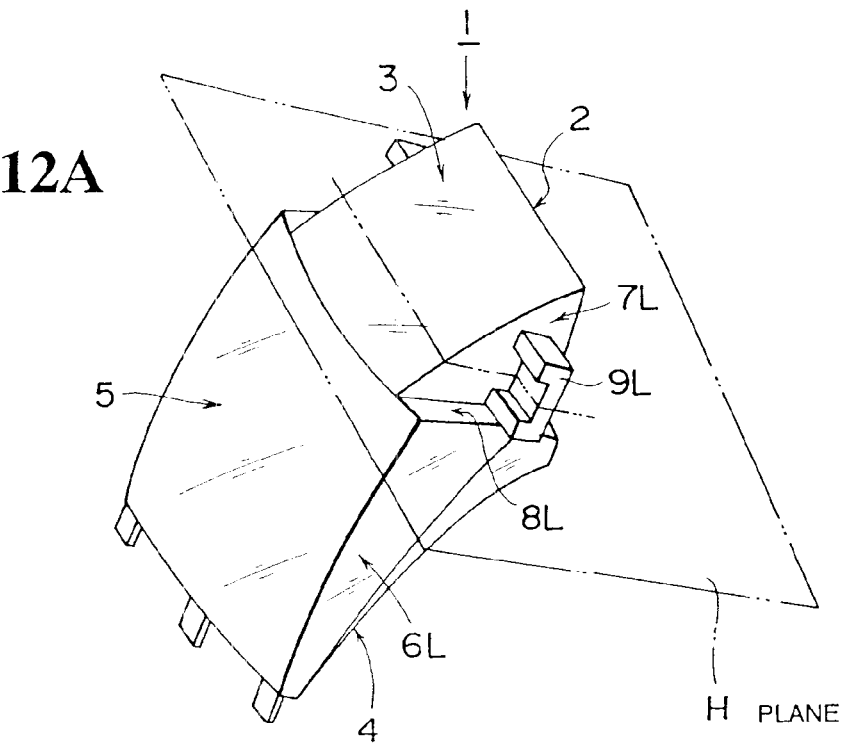
FIGS. 12A and 12B are views for describing the outer shape of the optical prism according to the present invention and features of the pertinent injection molding process.
Figure 12B:
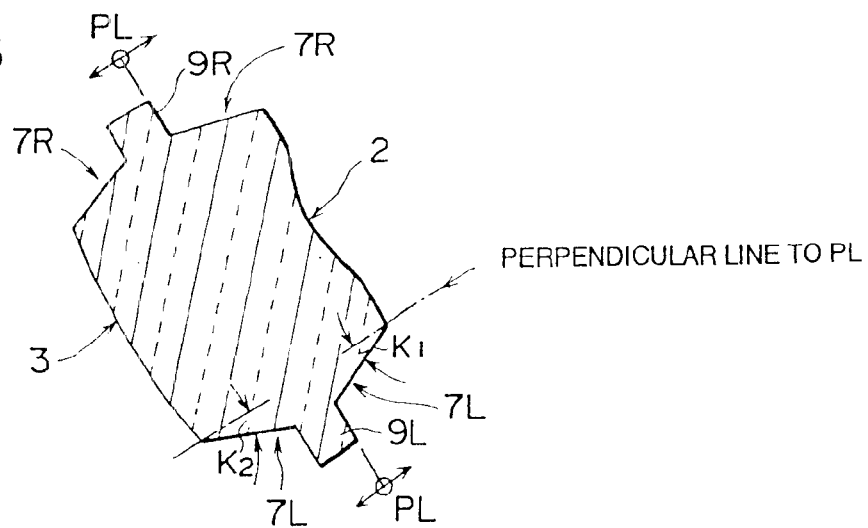

FIGS. 12A and 12B are views for describing the outer shape of the optical prism according to the present invention and features of the pertinent injection molding process.

FIG. 12A is a perspective view showing a manner of taking a sectional view of the optical prism according to the present invention described before in connection with FIGS. 1A to 1C. FIG. 12B is the sectional view of the part shown in FIG. 12A. In FIGS. 12A and 12B, parts like those described before in connection with FIGS. 1A to 1C are designated by like reference numerals and symbols, while omitting their detailed description.

The plane (i.e., H plane) along which to take the section shown in FIG. 12A, is set to be parallel to the die moving direction (or die removal direction) when fabricating the optical prism by the injection molding process. Thus the direction of the broken line in the sectional view of FIG. 12B is the die removal direction, which is perpendicular to a die split line (or plane) PL. As shown, the receded surfaces 7L and 7R have die removal slopes K1 and K2 when fabricating the optical prism 1 by the injection molding process. While only the die removal slopes K1 and K2 of the left side receded surface 7L of the optical prism 1 are labeled as such, the right side receded surface 7R also has the same die removal slopes.

FIGS. 13A and 13B are views for describing local surface treatment and die split line setting with an optical prism like that shown in FIGS. 12A and 12B.

FIG. 13A is a front view showing an optical prism according to the present invention as described before in connection with FIGS. 1A to 1C. FIG. 18 is a side view showing a portion shown in FIG. 13A. In FIGS. 13A and 13B, parts like those described before in connection with FIGS. 1A to 1C, 12A and 12B are designated by like reference numerals and symbols, while omitting their detailed description.

Referring to FIGS. 13A and 13B, shaded areas AVE have been subjected to a surface roughening treatment. The roughened surfaces have the die removal slopes K1 and K2 described before in connection with FIG. 12B. Satisfactory processibility is obtainable by setting the die removal slopes K1 and K2 to 3 to 20 degrees.

Referring to FIG. 13B, as in FIGS. 12A and 12B, a die split line (or plane) is labeled by PL.

It is a feature of the present invention that the die split line PL does not pass through the incidence and emission surfaces (i.e., D and A surfaces 2 and 4) and reflecting surfaces (i.e., B and C surfaces 5 and 3) as the optical surfaces and also the edges of these optical surfaces except for those defined between adjacent ones the optical surfaces. With this arrangement, the die removal slope when fabricating the optical prism by an injection molding process, is provided from two optical surfaces with respect to the die split line. It is thus possible to evade size increase of the optical prism while ensuring the effective optical size.

As shown in FIG. 13B, the die split line PL is set such that it passes through the projection 9R (and 9L as well). With this arrangement, it is possible, when fabricating the optical prism by the injection molding process, to readily form the projections which serve as portions for positioning the optical prism and the display or the like reactive to each other and also maintaining the relative positions of these components.

Particularly, the die split line PL is set such that it passes through a predetermined surface portion of the projection 9R (and 9L as well) that serves the position regulation. This means that the predetermined surface portion of the position regulation portion for determining the frame member of the display or the like, can readily have a sufficient area without being restricted by the die removal slope that is necessary for fabricating the optical prism by the injection molding process.

Figure 14A:
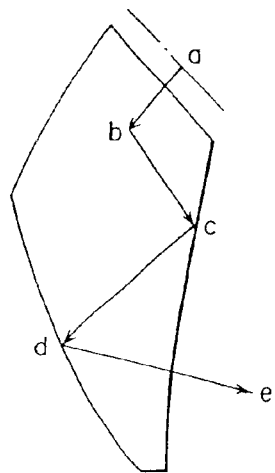
FIGS. 14A to 14C are views for describing the function of the local surface treatment (roughening treatment) of the optical prism described above in connection with FIGS. 13A and 13B.
Figure 14B:
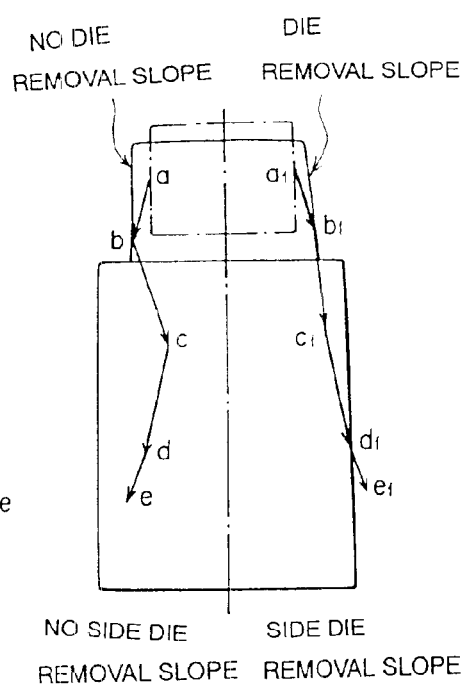
Figure 14C:
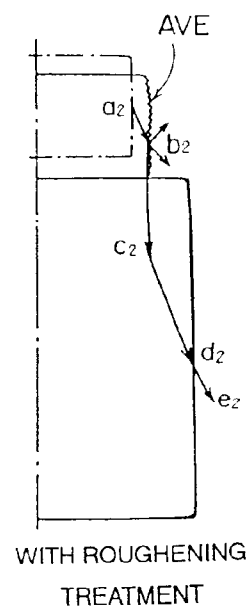

FIGS. 14A to 14C are views for describing the function of the local surface treatment (roughening treatment) of the optical prism described before in connection with FIGS. 13A and 13B.

FIG. 14A is a schematic side view depicting a manner, in which a light beam from point a of the display face of the display or the like is reflected at points b to d and then emitted in direction e. FIG. 14B is a schematic front view corresponding to FIG. 14A. In FIG. 14B, the left half concerns a case of an optical prism without any die removal slope provided, and the right half concerns an optical prism with die removal slope provided. In the case where the die removal slope is provided, reflection at point d1, corresponding to reflection at point d in the case where no die removal slope is provided, is not total reflection, but light partly leaks out in direction e1 (side-wise of the optical prism), giving rise to ghost effects in image viewing. FIG. 14C is a schematic front view concerning the case where the roughening treatment as described above in connection with FIGS. 13A and 13B is provided. In this case, in reflection at the roughened surface portion AVE, light is partly emitted outward as shown at b2. The emitted light re-enters the optical prism and leaks out in direction e2 (side-wise of the optical prism) without reflection at point d1. Undesired light beam that causes ghost effects thus can be greatly reduced.

Figure 15A:
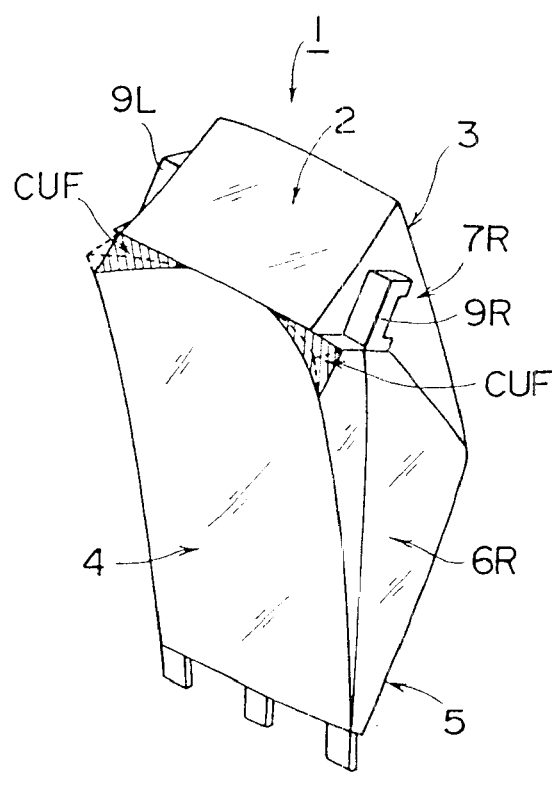
FIGS. 15A and 15B are views for describing a feature of the outer shape of the optical prism according to the present invention.
Figure 15B:
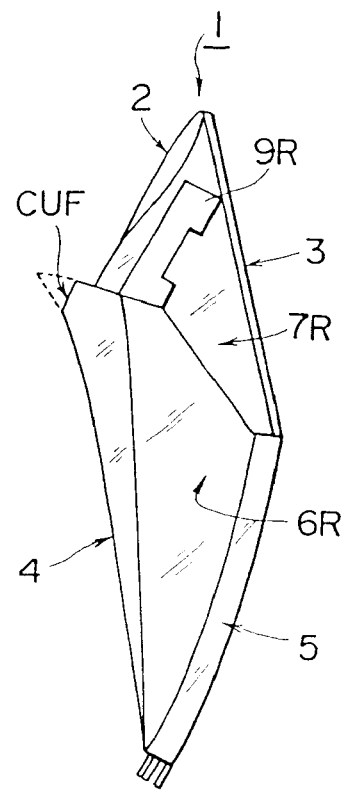

FIGS. 15A and 15B are views for describing a feature of the outer shape of the optical prism according to the present invention. The optical prism shown in FIGS. 15A and 15B is like that shown in FIGS. 1A to 1C, and parts like that shown in FIGS. 1A to 1C, and parts like those in FIGS. 1A to 1C are designated by like reference numerals and symbols, while omitting their detailed description.

FIG. 15A is a perspective view showing the optical prism with the incidence and emission surfaces (i.e., rear surfaces) thereof viewed obliquely above from behind. FIG. 15B is a side view of the optical prism.

As shown, predetermined portions (i.e., two portions) of imaginary edge portions (as shown shaded) having imaginary surface portions of the incidence and emission surfaces (i.e., D and A surfaces 2 and 4) as the optical surfaces, and those of the reflecting surfaces (i.e., B and C surfaces 5 and 3), other than the effective size areas, the adjacent imaginary surface portions defining imaginary edges CUF (in this example substantially triangular pyramidal portions as shown by broken lines), are chamfered. By adopting this shape, it is possible to further reduce the size and weight of the optical prism.

FIGS. 16A to 16C show another embodiment of the present invention. In the preceding embodiment of the optical prism, as described above in connection with FIG. 2, the incident light is reflected three times before being emitted. In this embodiment, the incident light is reflected twice before being emitted, as will be described hereinunder.

FIG. 16A is a perspective view showing this embodiment of the optical prism with an emission surface (or rear surface) viewed from above and behind. FIG. 16B is a perspective view showing the optical prism with an incidence surface and a reflecting surface (or rear surfaces) viewed from above and ahead. FIG. 16C is a side view showing the optical prism viewed in the width direction thereof.

Reference numeral 12 (see FIG. 16B) designates a forwardly inclined one of two surfaces defining the top edge of the optical prism 100. This surface 12 is an incidence surface (facing a display, such as an LCD) which is formed such as to be suitable for incidence of light from the display.

Reference numeral 14 (see FIG. 16A) designates a rearwardly inclined one of the two surfaces defining the top edge of the optical prism 100. This surface 14 is a reflecting/emission surface serving both as a reflecting surface, at which light beam incident from the surface 12 facing the display is reflected for the first time in the optical prism 100, and as an emission surface, through which light beam is emitted from the optical prism 100 to the outside.

Reference numeral 13 designates a surface extending downward from a lower edge of the surface 12 facing the display. This surface 13 is specifically an inner reflecting surface, at which a light beam having been reflected at the inner side of the reflecting/emission surface 14 is reflected for the second time in the optical prism 100. The surface 12 facing the display, the reflecting surface 13 and the reflecting/emission surface 14 are curved surfaces formed such as to satisfy necessary optical characteristics.

Left and right side surfaces 60LO and 60R are formed such that they cross the incidence surface 12 (facing the display), the reflecting/emission surface 14 and the reflecting surface 13. Recessed surfaces 70L and 70R are formed on the side of the two side surfaces 60L and 60R such that they do not interfere with an optical path of an effective size, along which the incident light is led from the incidence surface 13 to the reflecting/emission surface 14.

In the example shown in FIGS. 16A to 16C, a left and a right step surface 80L and 80R are formed such that they terminate in the receded surfaces 70L and 70R. By these step surfaces 80L and 80R, an upper part of the optical prism 100 with front and rear surfaces thereof constituted by the reflecting/emission surface 14 and the incidence surface 12 is made narrower than a lower part of the optical prism 100 with front and rear surfaces thereof constituted by the reflecting/emission surface 14 and the reflecting surface 13.

Projections 90L and 90R outwardly project from the receded surfaces 70L and 70R beyond the side surfaces 60L and 60R.

As has been described above in connection with FIGS. 16A to 16C, the incidence surface 12 (facing the display), the reflecting/emission surface 14 and the reflecting surface 13, are substantially quadrilateral as defined by their edges. Thus, it is possible to readily ensure necessary die processing accuracy when molding the optical prism by the injection molding process and readily ensure necessary processing accuracy of the optical prism itself.

Figure 17:
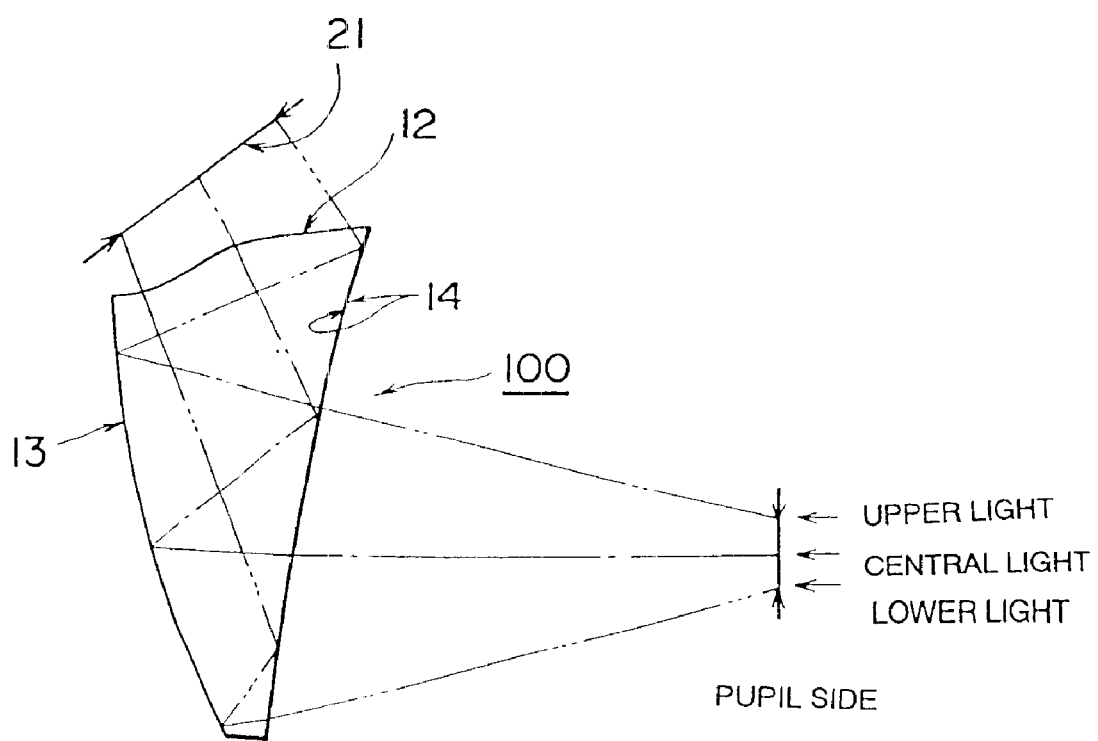
FIG. 17 is a view showing the optical path of an optical prism like that shown in FIGS. 16A to 16C.

FIG. 17 is a view showing the optical path of an optical prism like that shown in FIGS. 16A to 16C. In FIG. 17, parts like those shown in FIGS. 16A to 16C are designated by like reference numerals and symbols. A manner in which a light beam from a display face (or light source) of a display (for instance an LCD) is incident on the incidence surface 12 (facing the display), reflected for the first time at the inner side of the reflecting/emission surface 14, then reflected for the second time at the inner side of the reflecting surface 13 and then emitted through the reflecting/emission surface 14 to the pupil side, is depicted by three chain lines. As is readily understood from FIG. 17, the optical prism 100 is of twice reflection type.

Figure 18A:
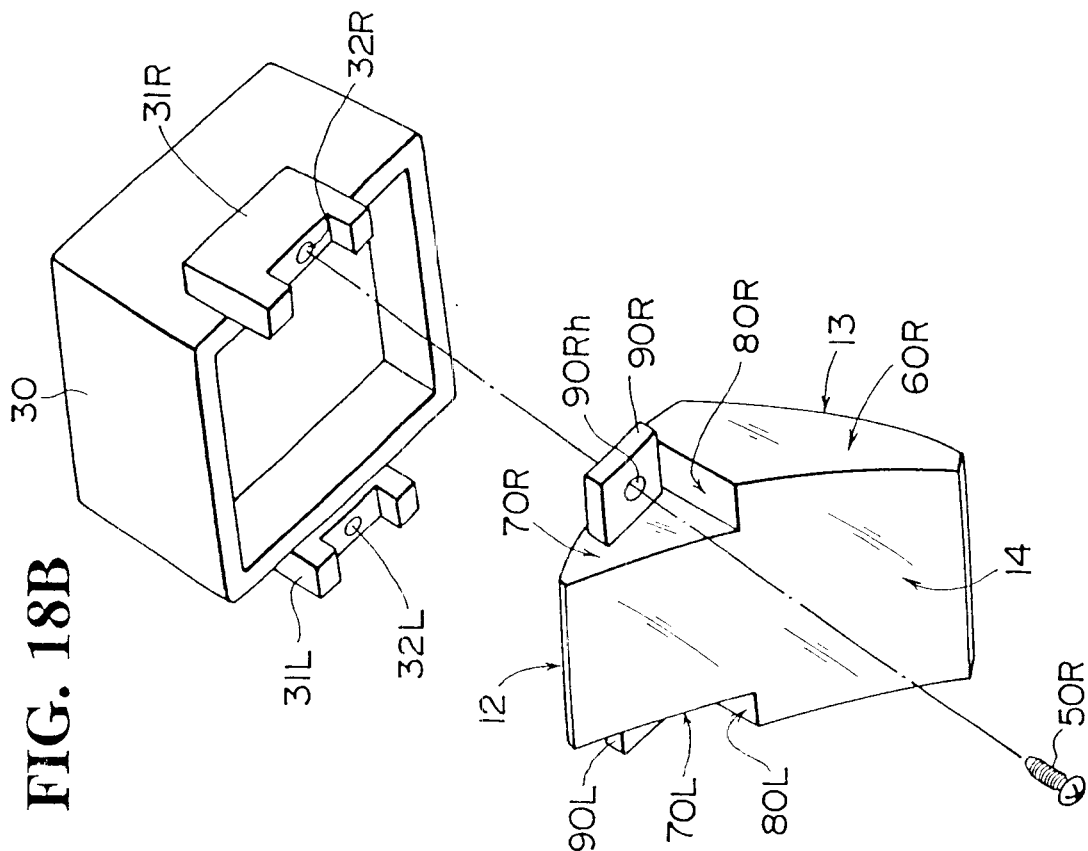
FIGS. 18A and 18B are views showing a manner of assembling an optical prism 100 and an associated casing 30, like those described before in connection with FIGS. 16A to 16C.
Figure 18B:
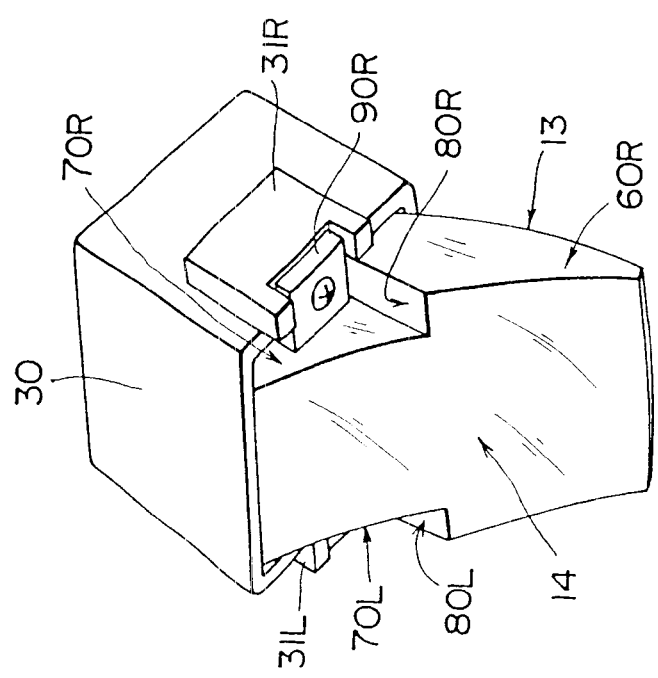

FIGS. 18A and 18B are views showing a manner of assembling an optical prism 100 and an associated casing 30, like those described before in connection with FIGS. 16A to 16C.

FIG. 18A is a perspective view showing the optical prism 100 and the casing 30 having been assembled together. FIG. 18B is an exploded perspective view showing the optical prism 100 and the casing 30 separately.

In FIGS. 18A and 18B, parts like those described before in connection with FIGS. 18A and 18B are designated by like reference numerals and symbols.

As shown, the casing 30 has a hollow rectangular body having optical system mounting members 31L and 31R outwardly projecting from the opposite sides. The optical system mounting members 31L and 31R have substantially central, through threaded holes 32L and 32R penetrating them in the forward/rearward directions. The optical prism 100 has projections 90L and 90R provided on receded surfaces 70L and 70R. The projections 90L and 90R have through holes 90Lh (not shown) and 90Rh penetrating them in the forward/rearward direction. The through holes 90Lh and 90Rh can be aligned to the through threaded holes 32L and 32R. The projections 90L and 90R of the optical prism 100 and the optical system mounting members 31L and 31R of the casing 30 are coupled to one another by a screw 50L (not shown, which is passed though the through hole 90Lh and screwed through the through threaded hole 32L, and a screw 50R, which is passed through the through hole 90Rh and screwed through the through threaded hole 32R. The optical system mounting members 31L and 31R have depressions corresponding to the projections 90L and 90R of the optical prism 1. The projections 90L and 90R can be snugly fitted in these depressions, whereby the optical prism and the casing are positioned relative to each other in the forward/rearward, transversal and vertical directions.

As described above, the three-times reflection prism and the twice reflection prism have substantially the same features, although they are different in their functional parts for obtaining their optical characteristics (such as optical face). The above detailed description of the three-times reflection prism is thus substantially applicable to the twice reflection prism as well As has been described in the foregoing, according to the present invention, when applied to optical elements of OA and various other systems, it is possible to realize an optical prism, which can ensure necessary accuracy of positioning of it and an image display relative to each other in a pertinent system and be readily fabricated.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An injection-molded optical prism, comprising:
   an incidence surface;
   a plurality of reflecting surfaces; and
   an emission surface,
   wherein the injection-molded optical prism comprises projections outwardly projecting from side surfaces crossing the incidence and emission surfaces and formed at transversal positions, said side surfaces include receded surfaces formed such as not to impede an optical path of an effective size, the incident light being led along the optical path from the incidence surface to the emission surface, and
   wherein the projections being disposed in such positions that a die split line set for the injection-molded optical prism passes through said projections.

2. The injection-molded optical prism according to claim 1, wherein the projections have positioning regulation portions formed in their predetermined portions and are adapted to regulate the positioning of a frame member supporting the light source, the die split line passing through predetermined surface portions of the positioning regulation portions.

3. The injection-molded optical prism according to claim 2, wherein predetermined surface portions of the projections other than the positioning regulation portions are set to be eject pin contact surfaces for an injection molding process.

4. A head mounted display device, comprising:
   a head frame; and
   an image display unit attached to said head frame,
   wherein said image display unit comprises an optical system having an optical prism according to claim 1.

5. An injection-molded optical prism according to claim 1, wherein said projections are outwardly projecting from said receded surfaces.

6. An injection-molded optical prism according to claim 1, wherein said die split line does not pass through edges of said incidence, emission and reflecting surfaces except at edges defined between adjacent surfaces of incidence, emission and reflecting surfaces.

7. An injection-molded optical prism according to claim 6, wherein a die removal slope is provided from each optical surface with respect to said die split line.

8. An optical prism, comprising:
   an incidence surface;
   a plurality of reflecting surfaces; and
   an emission surface,
   wherein the incidence and emission surfaces and the reflecting surfaces have flat surface regions of 1 millimeter or more in diameter formed outside effective size areas effectively utilized for measuring angular eccentricity of at least one of said incidence surface, said reflecting surfaces, and said emission surface.

9. A head mounted display device, comprising:
   a head frame; and
   an image display unit attached to said head frame,
   wherein said image display unit comprises an optical system having an optical prism according to claim 8.

10. An optical prism according to claim 8, wherein the flat surface regions are formed on the plural surfaces of the incidence, emission and reflecting surfaces.

11. An optical prism comprising:
    an incidence surface;
    a plurality of reflecting surfaces; and
    an emission surface,
    wherein at least one of the incidence surface, emission surface and plurality of reflecting surfaces have an index marking formed thereon configured to measure a positional relation and/or an angular eccentricity of at least one of the incidence surface, the plurality of reflecting surfaces and the emission surface.

12. A head mounted display device, comprising:
    a head frame; and
    an image display unit attached to said head frame,
    wherein said image display unit comprises an optical system having an optical prism according to claim 11.

13. An optical prism according to claim 11, wherein the index marking is formed on the plural surfaces of the incidence, emission and reflecting surfaces.

14. A head mounted display device, comprising:
a head frame; and
an image display unit attached to said head frame,
wherein said image display unit comprises:
   an optical system having a casing containing an image display source,
   an optical prism attachable to said casing, and
   a visor partially attenuating light passing therethrough,
said optical prism being positionable in an optical path of only one eye of a viewer while said visor is positionable in an optical path of only the other eye of said viewer.

* * * * *